(12) United States Patent
Allen

(10) Patent No.: US 10,114,187 B2
(45) Date of Patent: Oct. 30, 2018

(54) TWO-SIDED OPTICAL FIBER MANAGEMENT TRAY AND METHOD OF USE

(71) Applicant: CommScope Technologies LLC, Hickory, NC (US)

(72) Inventor: Barry Wayne Allen, Siler City, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/615,366

(22) Filed: Jun. 6, 2017

(65) Prior Publication Data
US 2017/0329096 A1    Nov. 16, 2017

Related U.S. Application Data

(63) Continuation of application No. 14/524,438, filed on Oct. 27, 2014, now abandoned.

(60) Provisional application No. 61/947,265, filed on Mar. 3, 2014, provisional application No. 61/911,304, filed on Dec. 3, 2013, provisional application No. 61/897,700, filed on Oct. 30, 2013.

(51) Int. Cl.
*G02B 6/44* (2006.01)

(52) U.S. Cl.
CPC ......... *G02B 6/4454* (2013.01); *G02B 6/4452* (2013.01)

(58) Field of Classification Search
USPC ....................................................... 385/135
See application file for complete search history.

(56) References Cited

U.S. PATENT DOCUMENTS

| 4,702,551 | A |   | 10/1987 | Coulombe |
| 5,375,185 | A | * | 12/1994 | Hermsen ............. G02B 6/4454 |
|           |   |   |         | 385/135 |
| 5,421,532 | A |   | 6/1995  | Richter |
| 6,456,772 | B1 | * | 9/2002  | Daoud ................ G02B 6/4471 |
|           |   |   |         | 385/135 |
| 6,507,691 | B1 |   | 1/2003  | Hunsinger et al. |

(Continued)

FOREIGN PATENT DOCUMENTS

| EP | 2 383 596 A1 | 11/2011 |
| EP | 2 463 697 A1 | 6/2012 |

(Continued)

OTHER PUBLICATIONS

International Search Report and Written Opinion for Application No. PCT/US2014/062422 dated Jan. 30, 2015.

(Continued)

*Primary Examiner* — Eric Wong
(74) *Attorney, Agent, or Firm* — Merchant & Gould, P.C.

(57) ABSTRACT

An arrangement for a fiber optic distribution network includes a fiber management tray having a first major side and an opposite second major side. The arrangement also includes a fiber optic cable including optical fibers. The fiber optic cable has first and second jacketed sections and an unjacketed mid-span access location positioned between the first and second jacketed sections. The unjacketed mid-span access location can be managed by the fiber management tray with drop splicing being performed at the first major side of the tray and the remainder of the fiber management and splicing being performed at the second major side of the tray.

21 Claims, 35 Drawing Sheets

(56) References Cited

U.S. PATENT DOCUMENTS

| | | |
|---|---|---|
| 7,744,288 B2 | 6/2010 | Lu et al. |
| 8,554,044 B2 | 10/2013 | Bran de Leon et al. |
| 8,953,924 B2 * | 2/2015 | Cote ................ G02B 6/4471 385/135 |
| 9,417,401 B2 | 8/2016 | Zhang |
| 2004/0175090 A1 | 9/2004 | Vastmans et al. |
| 2005/0123261 A1 | 6/2005 | Bellekens et al. |
| 2006/0083475 A1 | 4/2006 | Grubish et al. |
| 2010/0322578 A1 * | 12/2010 | Cooke ................ G02B 6/4471 385/135 |
| 2010/0329621 A1 * | 12/2010 | Makrides-Saravanos ........ G02B 6/4446 385/135 |
| 2010/0329624 A1 * | 12/2010 | Zhou ................ G02B 6/4454 385/135 |
| 2011/0052133 A1 | 3/2011 | Simmons et al. |
| 2011/0164853 A1 | 7/2011 | Corbille et al. |
| 2011/0262095 A1 * | 10/2011 | Fabrykowski ....... G02B 6/4466 385/135 |
| 2011/0317974 A1 | 12/2011 | Krampotich et al. |
| 2012/0134639 A1 | 5/2012 | Giraud et al. |
| 2013/0094826 A1 * | 4/2013 | Marsac ................ G02B 6/4446 385/135 |
| 2013/0105420 A1 * | 5/2013 | Ray ....................... G02B 6/4454 211/13.1 |
| 2013/0148936 A1 | 6/2013 | Hill |
| 2013/0243386 A1 | 9/2013 | Pimentel et al. |
| 2015/0241654 A1 * | 8/2015 | Allen ................ G02B 6/4454 385/135 |
| 2016/0215901 A1 * | 7/2016 | Takeuchi ............ G02B 6/4461 |

FOREIGN PATENT DOCUMENTS

| | | |
|---|---|---|
| EP | 2 533 086 A1 | 12/2012 |
| GB | 2 368 136 A | 4/2002 |
| WO | 2013/085649 A1 | 6/2013 |

OTHER PUBLICATIONS

Partial Supplementary European Search Report for Application No. 14857814.9 dated Jun. 9, 2017.

* cited by examiner

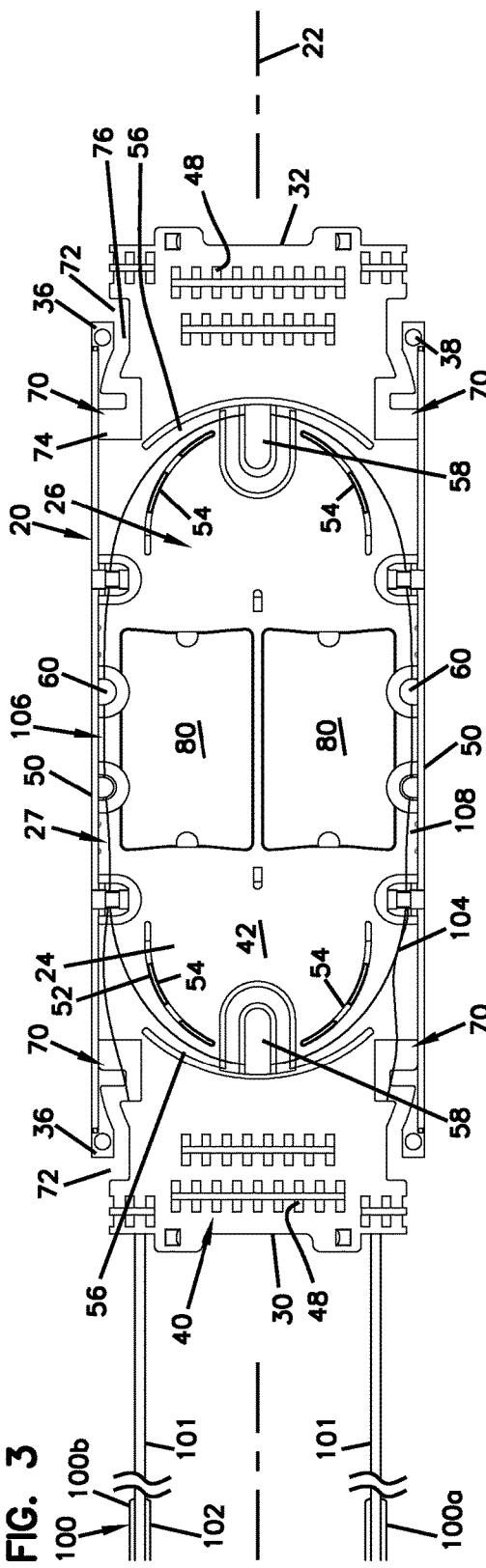
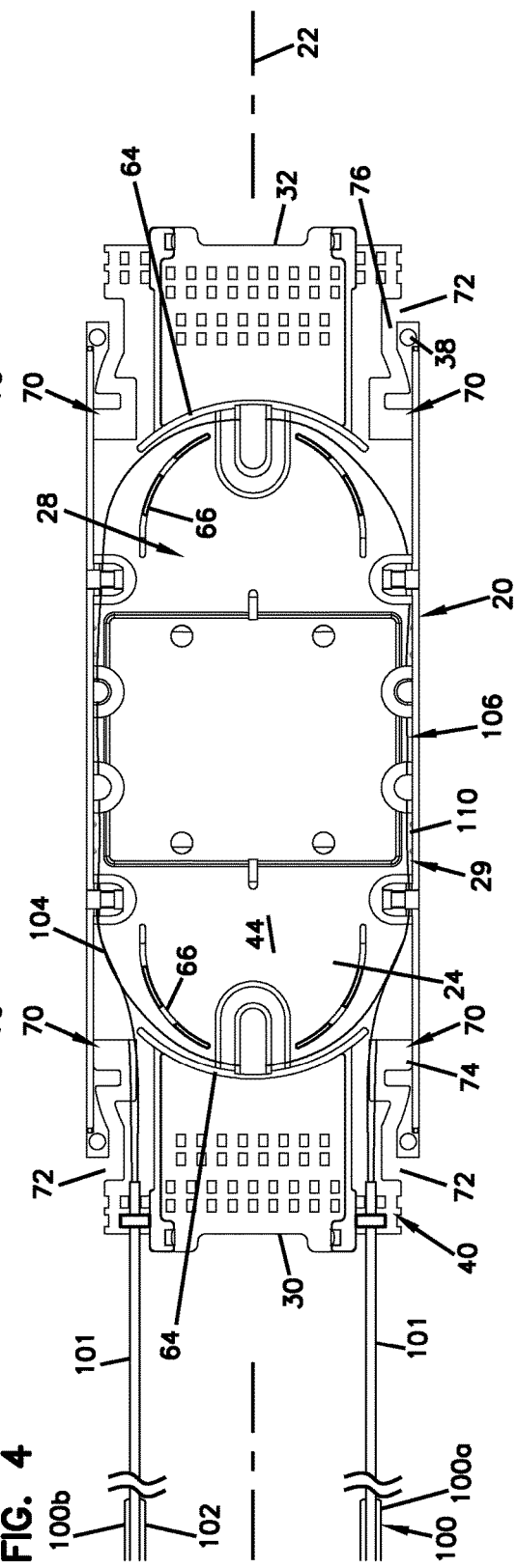
FIG. 3
FIG. 4

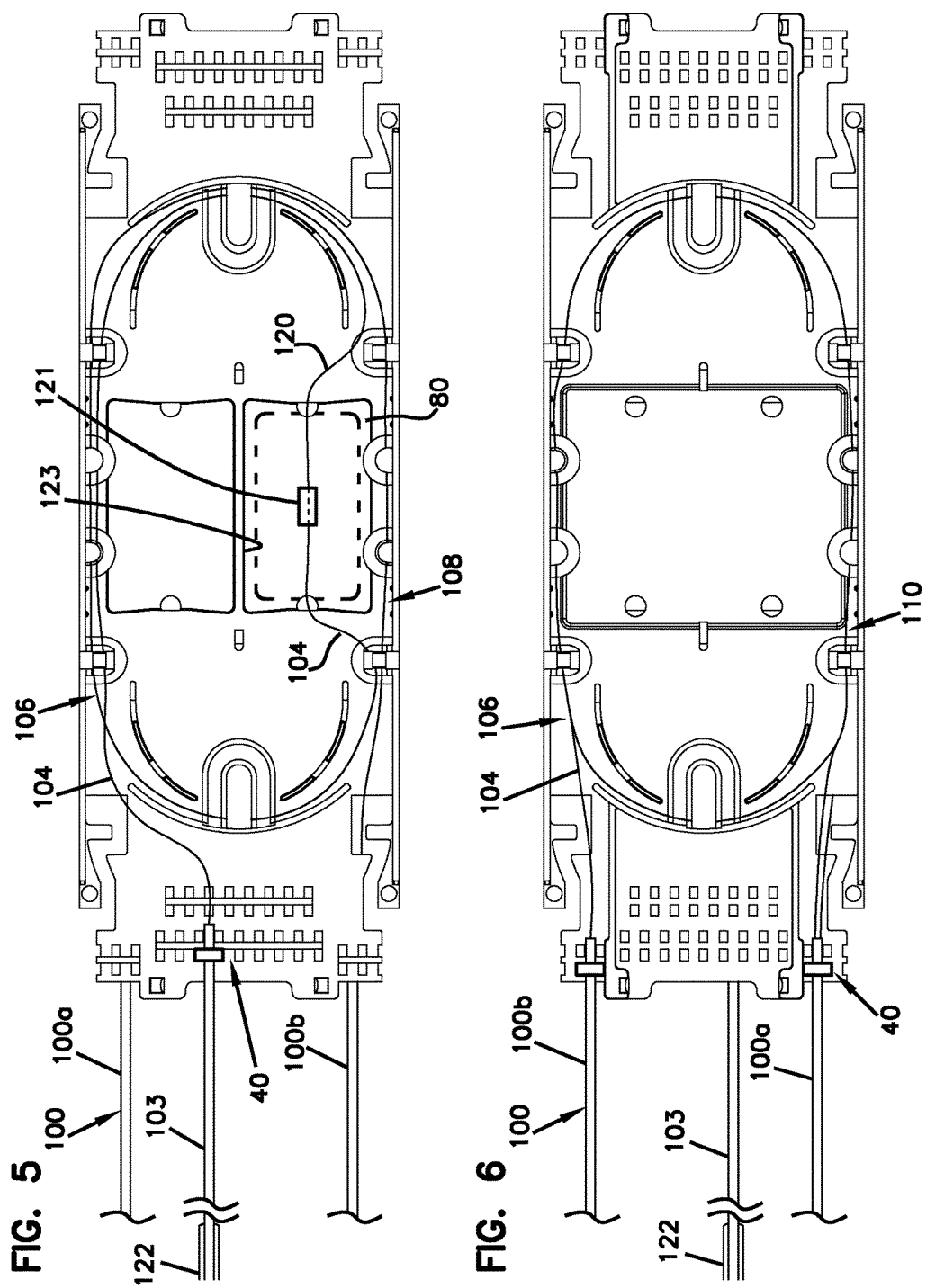

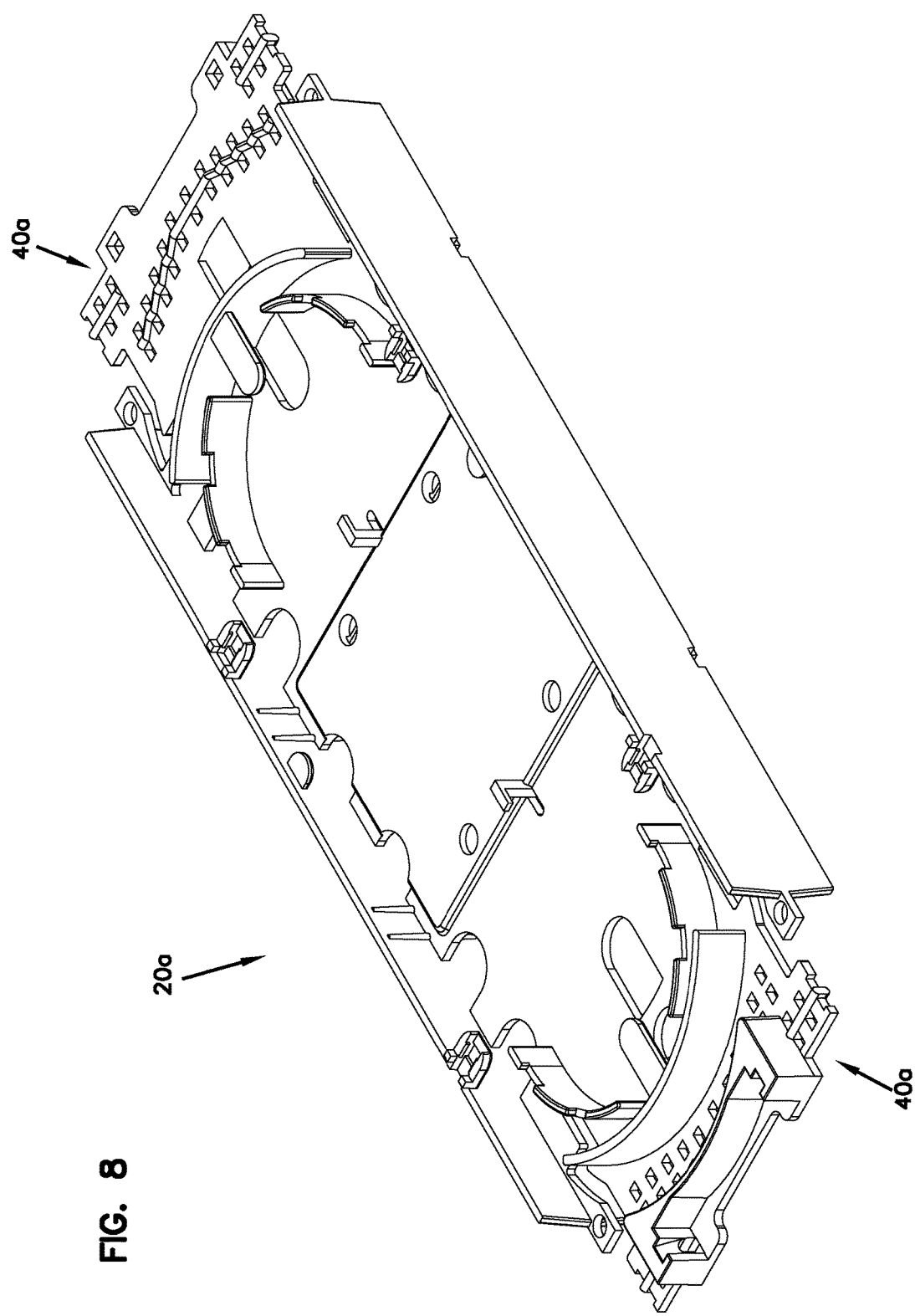

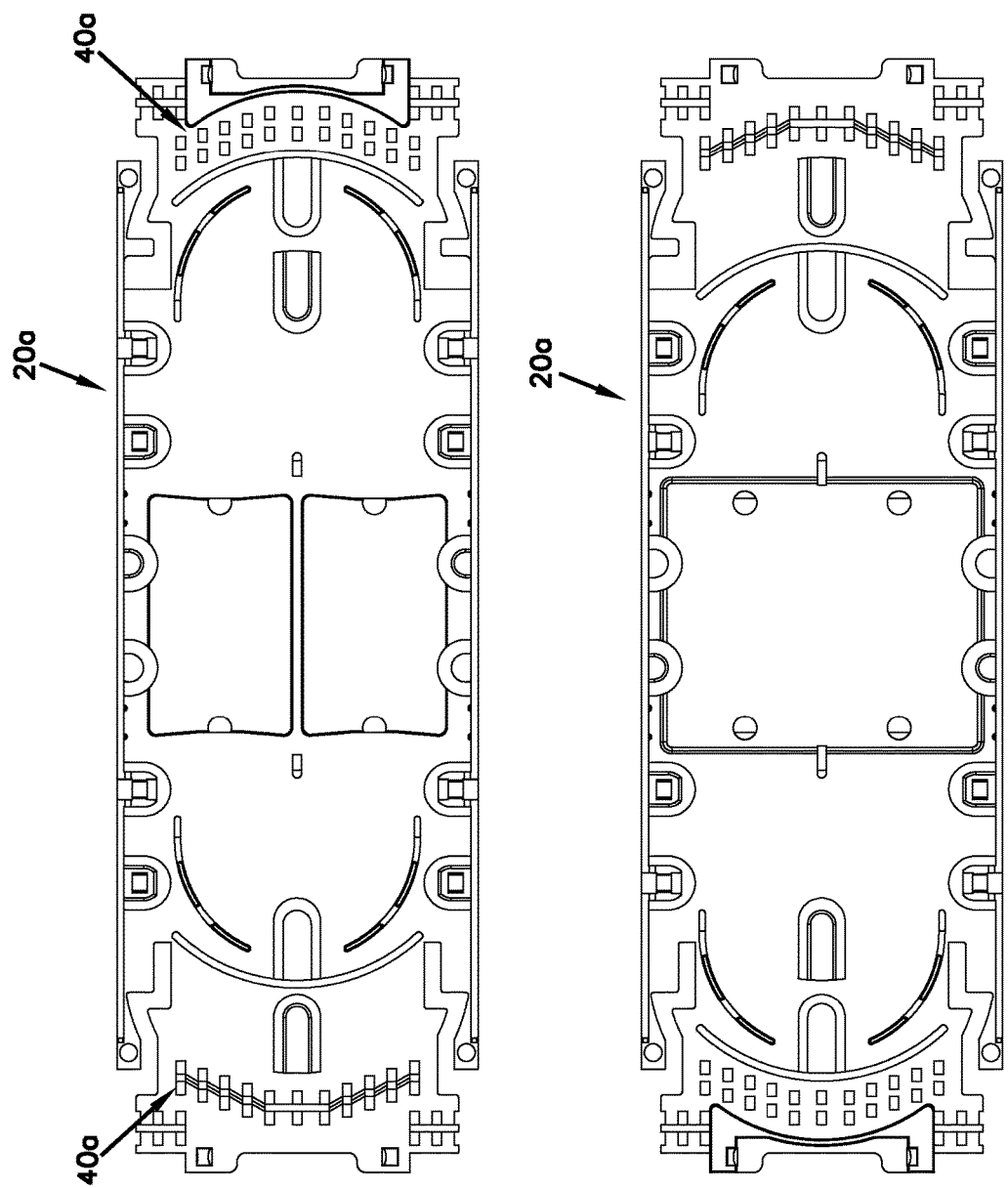

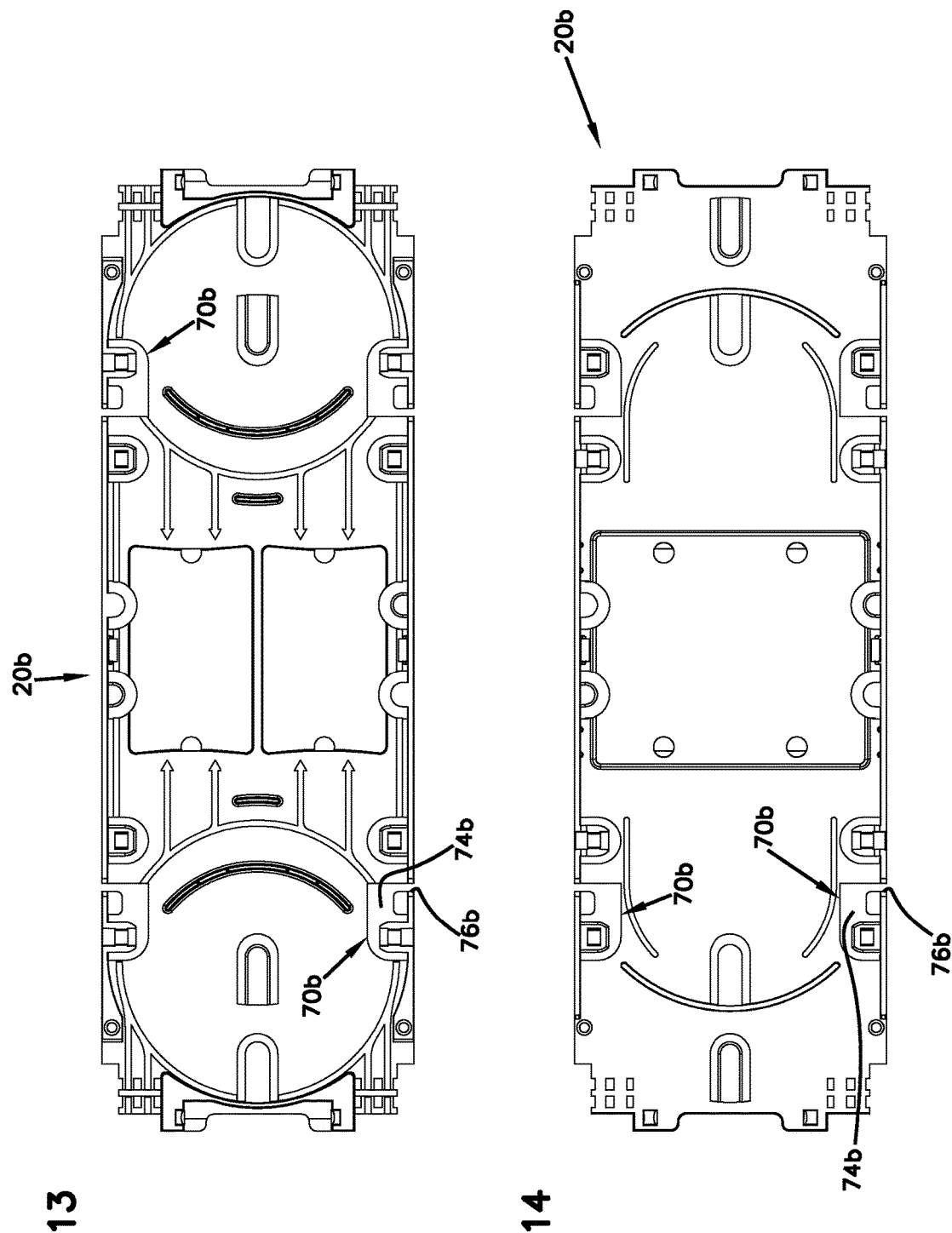

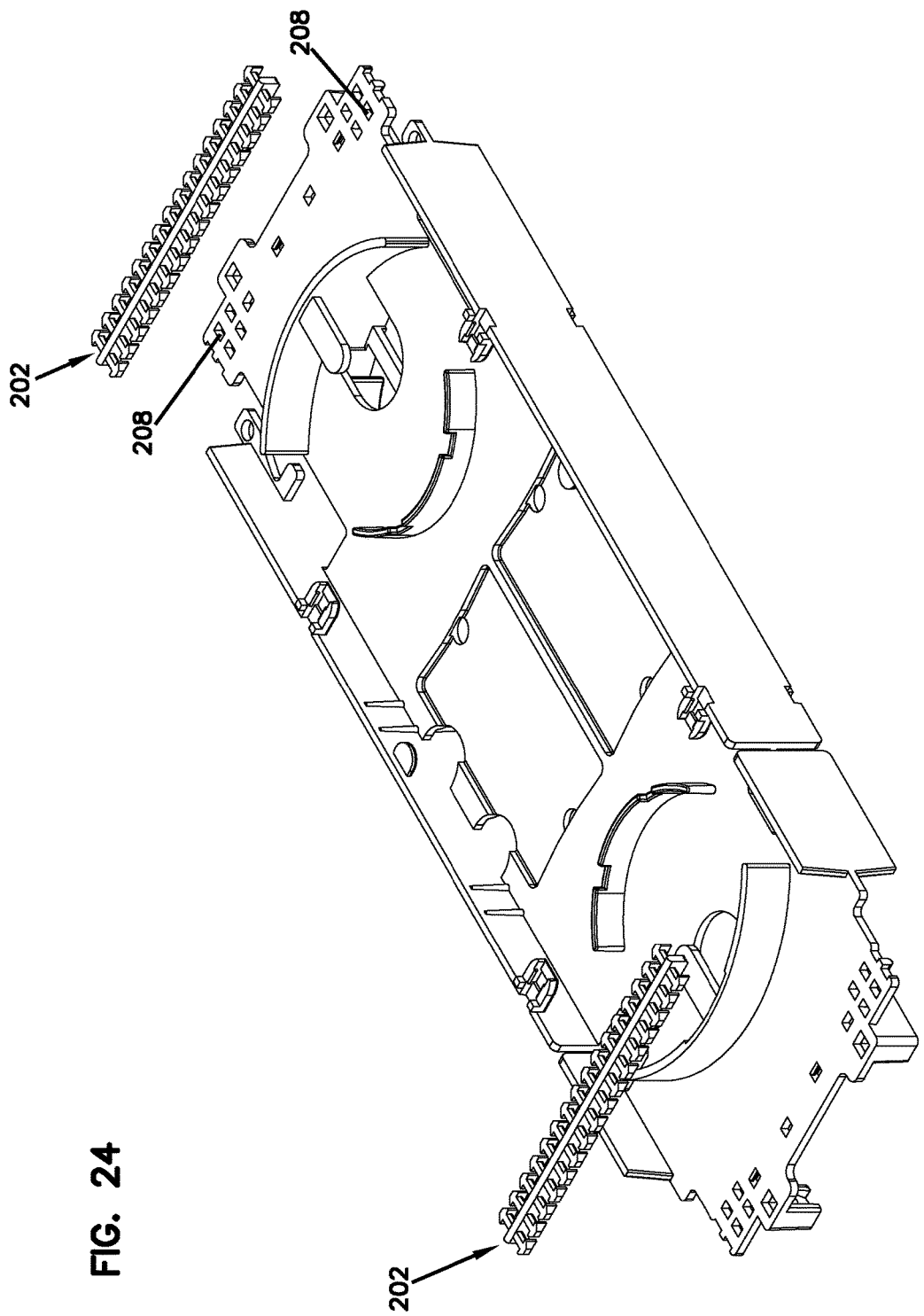

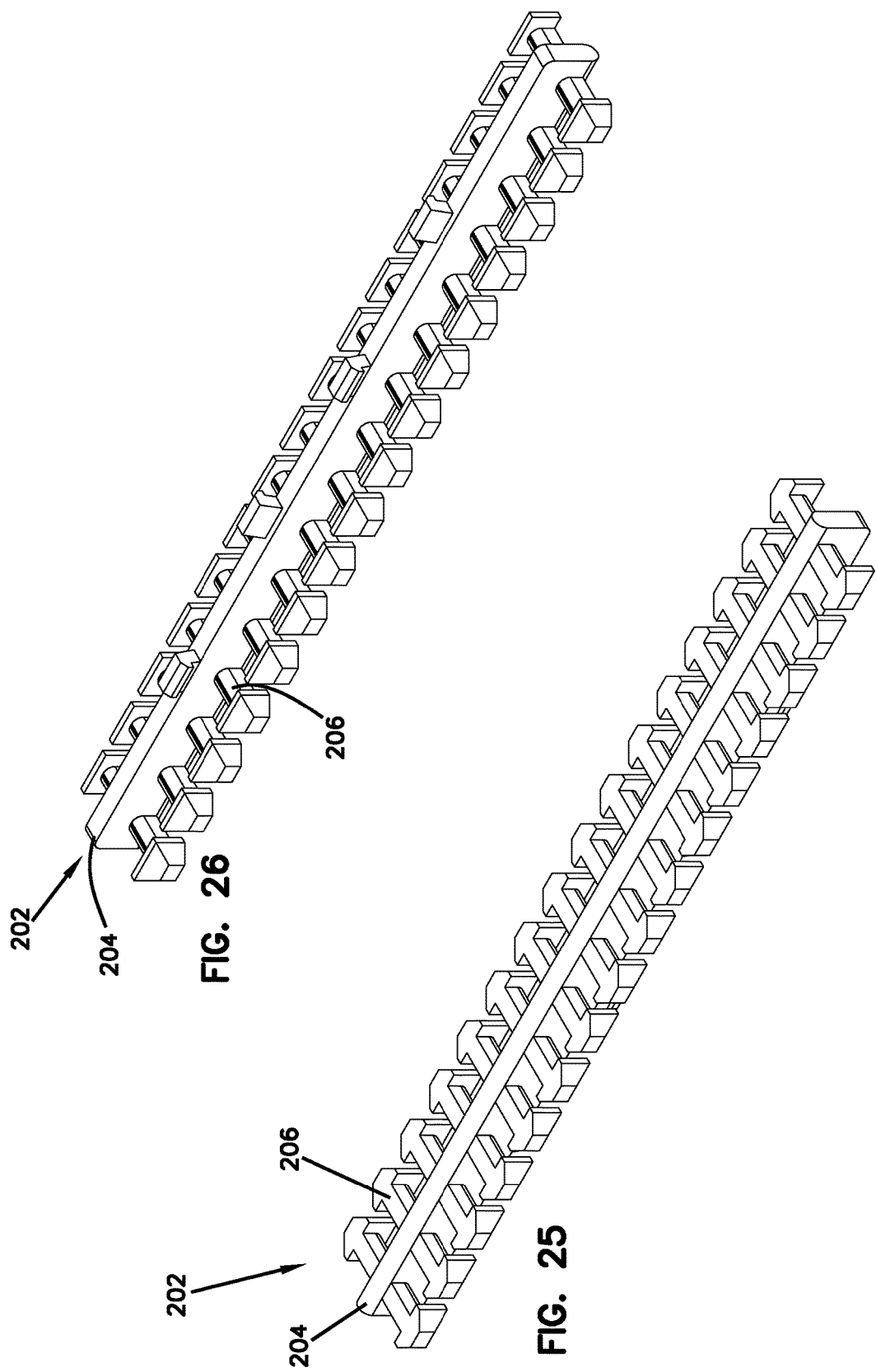

TWO-SIDED OPTICAL FIBER MANAGEMENT TRAY AND METHOD OF USE

CROSS-REFERENCE TO RELATED APPLICATIONS

This application is a continuation of U.S. patent application Ser. No. 14/524,438, filed Oct. 27, 2014, now abandoned, which claims priority to U.S. Provisional Patent Application Ser. Nos. 61/897,700 filed on Oct. 30, 2013; 61/911,304 filed on Dec. 3, 2013; and 61/947,265 filed on Mar. 3, 2014, the disclosures of which are incorporated herein by reference in their entireties.

TECHNICAL FIELD

The present disclosure relates generally to components for managing optical fiber in a fiber optic communication network. More particularly, the present disclosure relates to optical fiber management trays used to manage optical fiber in a fiber optic communications network.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Fiber management is an important part of operating and maintaining an effective fiber optic communication system. Fiber management trays are commonly used to effectively manage and protect optical fiber in a fiber optic communication system. A typical fiber management tray provides splicing and fiber management functionality. Most fiber management trays are single-sided and fiber management trays are often arranged in a stack with the individual fiber management trays being pivotally mounted relative to one another. Example splice trays of this type are disclosed at U.S. Pat. Nos. 8,554,044 and 6,507,691.

SUMMARY

One aspect of the present disclosure relates to a two-sided fiber management tray that allows optical fibers to be stored and managed at opposite first and second major sides of the tray. In one example, the tray defines a fiber wraparound transition structure that allows optical fibers to be routed/transitioned between the first and second sides.

Another aspect of the present disclosure relates to a two-sided optical fiber management tray having opposite top/front and bottom/back sides. The optical fiber management tray is particularly well suited for managing optical fibers at a mid-span access location of a multi-fiber optical cable. At a mid-span access location, it is often desirable to access some of the optical fibers for splicing to drop cables while allowing the remainder of the optical fibers to pass through the mid-span access location without being accessed (e.g., cut and spliced to a drop cable or connected to an optical component such as a passive power splitter or a wavelength division multi-plexer).

When a tray in accordance with the principles of the present disclosure is used to manage a mid-span access location, pass-through fibers of the mid-span access location can be stored/managed on the back/bottom side of the tray and fibers of the mid-span access location desired to be accessed for splicing can be stored/managed at the top/front side of the tray. Buffer tubes containing optical fibers from the cable can be anchored to the bottom/back side of the tray and buffer tubes containing optical fibers corresponding to the drop cables can be anchored to the top/front side of the tray. A wraparound-style routing transition can be provided through the tray to permit the optical fibers intended to be spliced to drop cables to be routed from the bottom/back side of the tray to the top/front side of the tray. In this way, the optical fibers intended to be spliced are effectively separated/segregated from the pass-through fibers.

This type of arrangement is particularly well suited for a two stage deployment method where: a) an initial construction crew lays out the fiber distribution network and routes the splice fibers to the top/front of the tray and the pass-through fibers to the bottom/back of the tray; and b) a subsequent installation crew accesses the splice fibers for splicing to drop cables. The segregation of the splice fibers from the passthrough fibers ensures that the proper optical fibers are accessed for splicing during the installation stage.

In certain examples, the back side has sufficient area to hold passive optical components (e.g., passive optical power splitters, wavelength division multiplexers, etc.) that can be optically coupled to one or more of the optical fibers of the mid-span access location. The passive optical components can be either factory or field mounted. In certain example, splice holders can be provided at either the top/front or bottom/back side.

In certain examples, buffer tube fixation regions can be provided for fixing buffer tubes corresponding to pass-through cables and buffer tubes corresponding to drop cables to the tray. In certain examples, trays in accordance with the principles of the present disclosure can accommodate buffer tubes corresponding to up to twenty drop cables. In other examples, splice trays in accordance with the principles of the present disclosure can accommodate buffer tubes corresponding to more or less than twenty drop cables. In certain examples, trays in accordance with the principles of the present disclosure may eliminate the need for multiple trays thus reducing cost and simplifying installation practices.

In certain examples, splice trays in accordance with the principles of the present disclosure may simplify incorporating passive optical components into a splice terminal/splice enclosure.

In certain examples, the tray in accordance with the principles of the present disclosure can include a bottom side for supporting an optical component, such as an optical power splitter or wavelength division multiplexer, and a top side for facilitating drop cable splicing. In such an example, an optical fiber from a mid-span access location of a multi-fiber fiber optic cable can be spliced to the optical component at the bottom side of the tray. It will be appreciated that the optical component can provide splitting so as to have more outputs than inputs. Output fibers can be provided corresponding to the outputs. At least some of the output fibers from the optical component can be routed from the bottom side of the tray to the top side of the tray so as to be available for splicing to optical fibers corresponding to drop cables. Other output fibers from the optical component can be spliced to optical fibers corresponding to the multi-fiber cable such that signals can be fed in a downstream and/or upstream direction through the multi-fiber fiber optic cable.

A variety of additional aspects will be set forth in the description that follows. The aspects relate to individual features and to combinations of features. It is to be understood that both the forgoing general description and the following detailed description are explanatory only and are not restrictive of the broad inventive concepts upon which the examples disclosed herein are based.

BRIEF DESCRIPTION OF THE DRAWINGS

FIG. 3 is a plan view showing the top side of the fiber management tray of FIGS. 1 and 2, optical fibers of a mid-span access location of a cable are shown being managed by the fiber management tray;

FIG. 4 is a plan view showing the bottom side of the fiber management tray of FIGS. 1 and 2, optical fibers of the mid-span access location of the cable are shown being managed by the fiber management tray;

FIG. 5 is a plan view showing the top side of the fiber management tray of FIGS. 1 and 2, one of the optical fibers of the mid-span access location of the cable is shown spliced to a drop cable;

FIG. 6 is a plan view showing the bottom side of the fiber management tray of FIGS. 1 and 2, one of the optical fibers of the mid-span access location of the cable is shown spliced to the drop cable;

FIG. 8 is a perspective view of a bottom side of the fiber management tray of FIG. 7;

FIG. 9 is a plan view showing the top side of the fiber management tray of FIGS. 7 and 8;

FIG. 10 is a plan view showing the bottom side of the fiber management tray of FIGS. 7 and 8;

FIG. 13 is a plan view showing the top side of the fiber management tray of FIGS. 11 and 12;

FIG. 14 is a plan view showing the bottom side of the fiber management tray of FIGS. 11 and 12;

FIGS. 23-26 show an example buffer tube anchoring configuration in accordance with the principles of the present disclosure;

DETAILED DESCRIPTION

Figure 1:
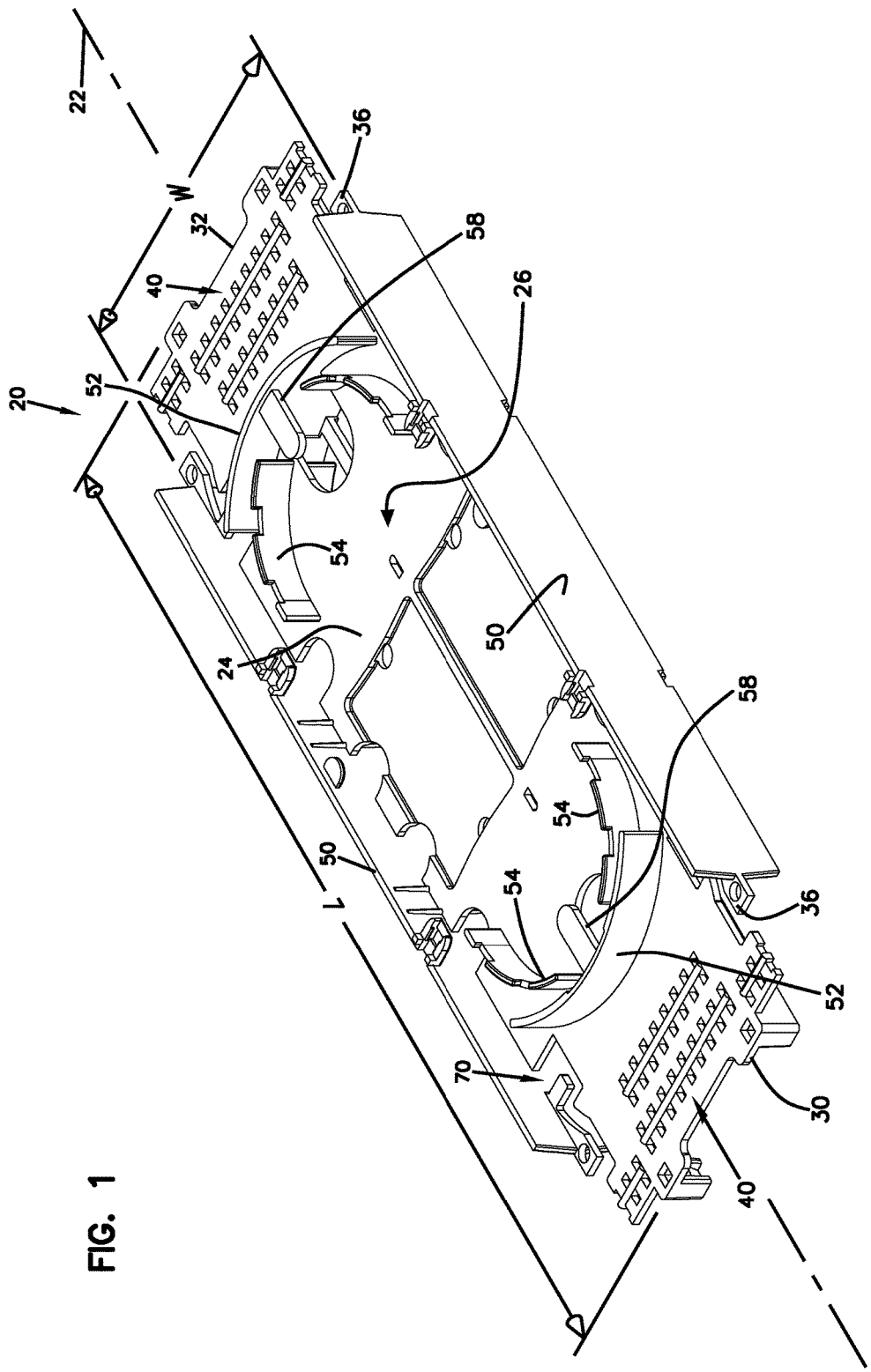
FIG. 1 is a perspective view showing a top side of a fiber management tray in accordance with the principles of the present disclosure.

The present disclosure relates generally to fiber management trays designed to reduce cost and simplify installation practices. The present disclosure also relates to fiber management trays configured to accommodate passive optical components such as optical power splitters and wavelength division multiplexers. The present disclosure also relates to fiber management trays suited for effectively managing the optical fibers of a mid-span access location of a multi-fiber optical cable. The present disclosure also relates to two-sided trays that allow for optical fibers storage and routing on opposite first (e.g., top/front) and second (e.g., bottom/back) major sides of the trays.

In certain examples, fiber management trays in accordance with the principles of the present disclosure can include a routing transition structure that permits fibers to be routed between opposite major sides of the trays. In certain examples, such routing transition structures can have a wraparound configuration that allows fibers to be laterally inserted into the transition structures thereby eliminating the need to insert (i.e., thread) free ends of the optical fibers axially through the transition structures. Thus, mid-span portions of the optical fibers can be inserted into the routing transition structures. In certain examples, fiber management trays in accordance with the principles of the present disclosure can have buffer tube fixation (i.e., anchoring) locations and can also have pre-defined fiber routing paths (e.g., one or more fiber loops). In certain examples, the pre-defined fiber-routing paths can be provided at both the first and second sides of the tray. The fiber routing paths can be defined by guides, walls, dividers, separators, and/or fiber bend radius limiters for guiding optical fibers along pre-defined routing paths and for preventing the optical fibers from being bent beyond pre-defined bend radius limitations.

In certain examples, fiber management trays in accordance with the principles of the present disclosure can include structures for mounting optical fiber splices and/or passive optical components on either the first or second major sides of the trays. The fiber guide structures can also support other routing paths such as a figure eight pattern and a partial loop.

Optical fiber management trays in accordance with the principles of the present disclosure can be particularly well suited for managing optical fibers at a mid-span access location of a multi-fiber optical cable. At a mid-span access location, it is often desirable to access some of the optical fibers of the multi-fiber optical cable for splicing to drop cables (e.g., cut and spliced to a drop cable or connected to an optical component such as a passive power splitter or a wavelength division multi-plexer) while allowing the remainder of the optical fibers to pass through the mid-span access location without being accessed. When a tray in accordance with the principles of the present disclosure is used to manage a mid-span access location, fibers of the mid-span access location desired to be accessed for splicing can be stored/managed at a first major side of the tray and pass-through fibers of the mid-span access location can be stored/managed on a second major side of the tray. Ends of buffer tubes protecting the optical fibers can be anchored to the tray (e.g., at either side of the tray). In one example, buffer tubes corresponding to optical fibers of the multi-fiber optical cable can be anchored to the second major side of the tray while buffer tubes protecting optical fibers corresponding to the drop cables can be anchored to the first major side of the tray. A wraparound-style routing transition can be provided through the tray to permit the optical fibers intended to be spliced to drop cables to be routed between the first and second major sides of the tray. In this way, the optical fibers of the multi-fiber cable intended to be spliced to drop cables at the mid-span location are effectively separated/segregated from the remainder of the optical fibers of the multi-fiber cable.

This type of arrangement is particularly well suited for a two-stage deployment method where: a) an initial construction crew lays out the fiber distribution network and routes the fibers intended to be spliced to drop cable fibers at the mid-span location to the top/front of the tray and the remainder of the optical fibers to the bottom/back of the tray; and b) a subsequent installation crew accesses the fibers for splicing to drop cables, and anchors buffer tubes corresponding to the drop cables to the front/top of the tray. The segregation of the fibers intended to be spliced to drop cables from the other optical fibers ensures that the proper optical fibers are accessed for splicing during the installation stage.

FIGS. 1-4 illustrate a fiber management tray 20 in accordance with the principles of the present disclosure. The fiber management tray 20 is shown having a generally rectangular configuration. In the depicted example, the fiber management tray 20 is elongated along an axis 22 and includes a length L and a width W. The length L extends along the axis 22 and is longer than the width W.

Figure 2:
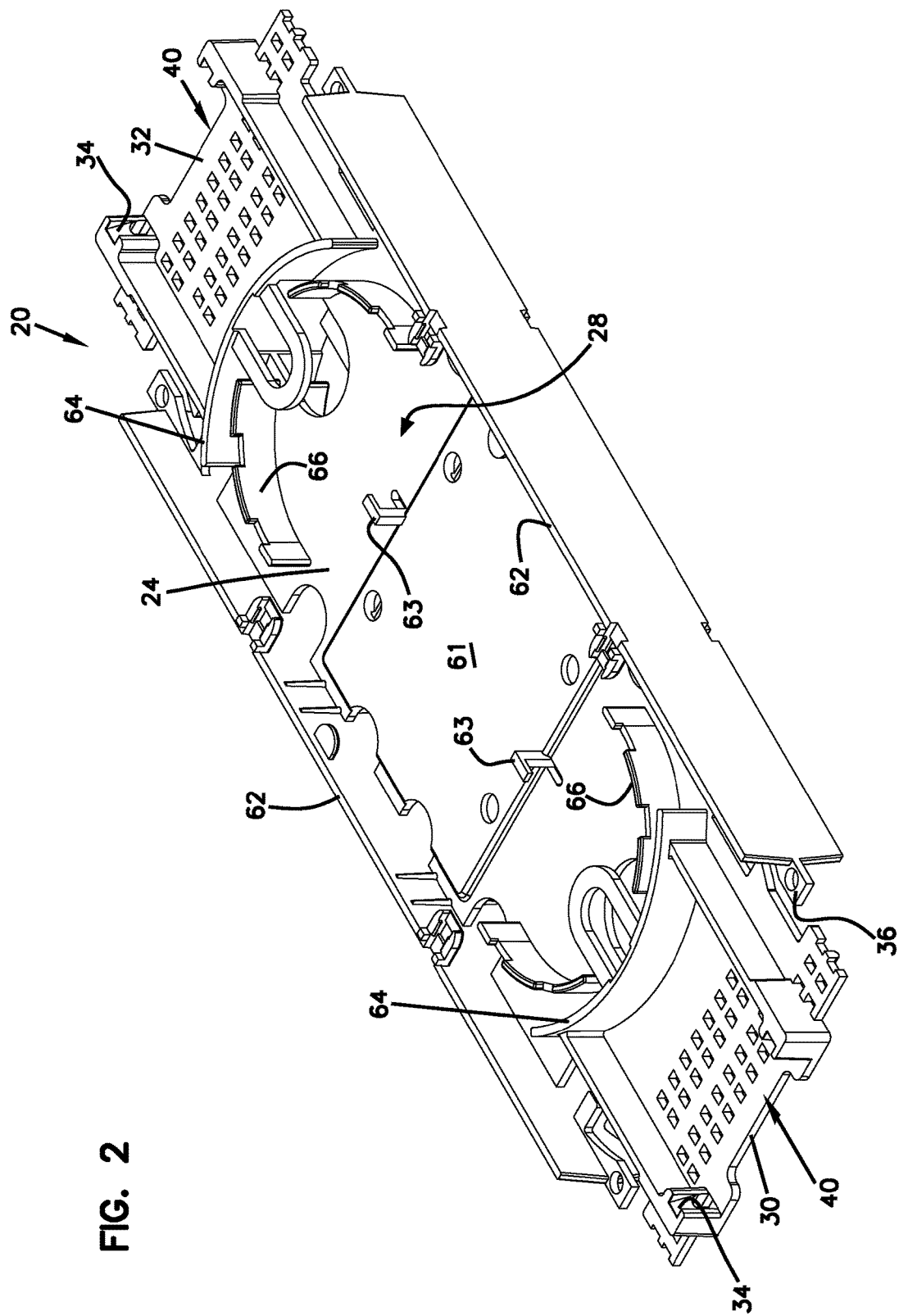
FIG. 2 is a perspective view showing a bottom side of the fiber management tray of FIG. 1.
Figure 7:
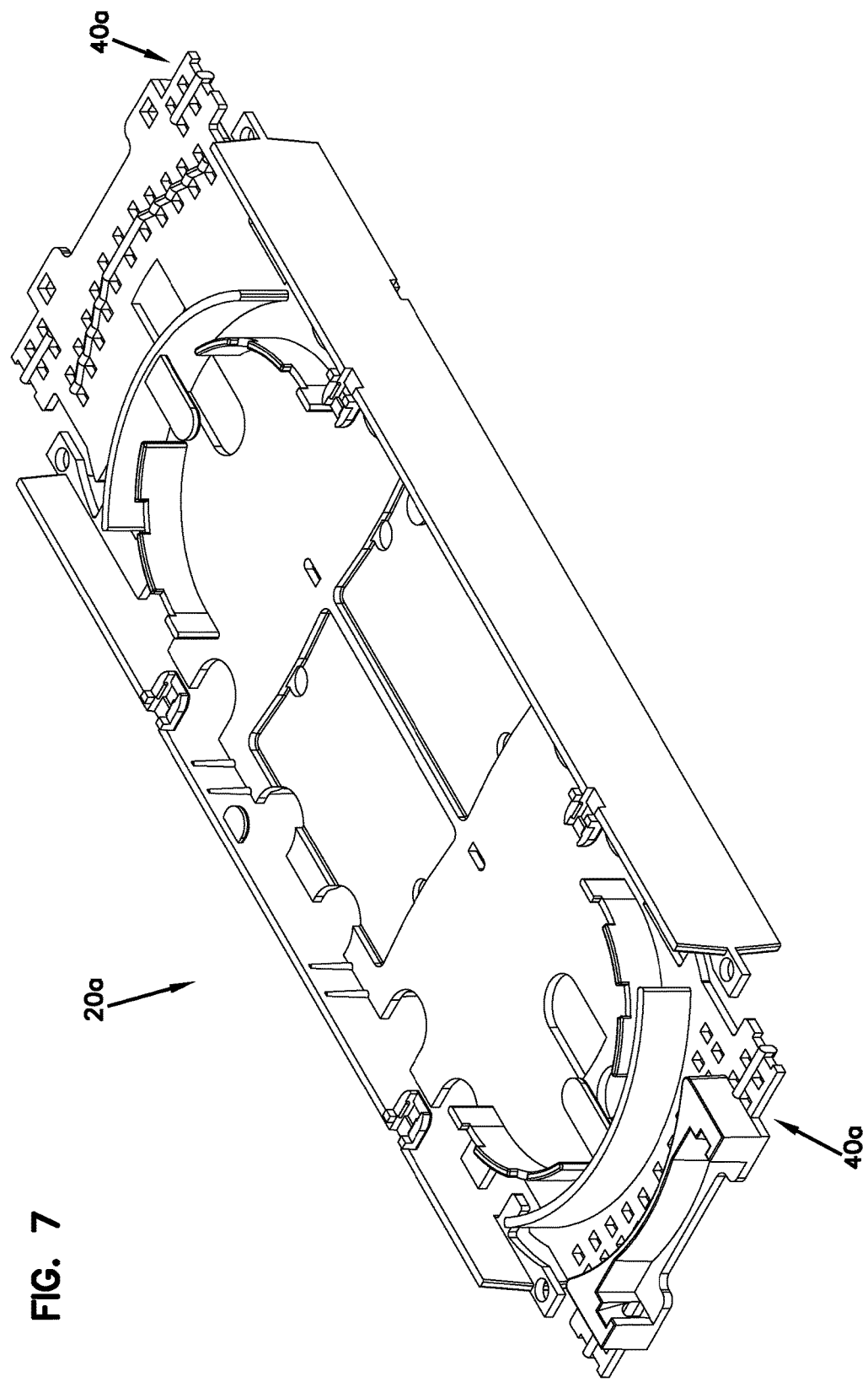
FIG. 7 is a perspective view of a top side of another fiber management tray in accordance with the principles of the present disclosure.
Figure 11:
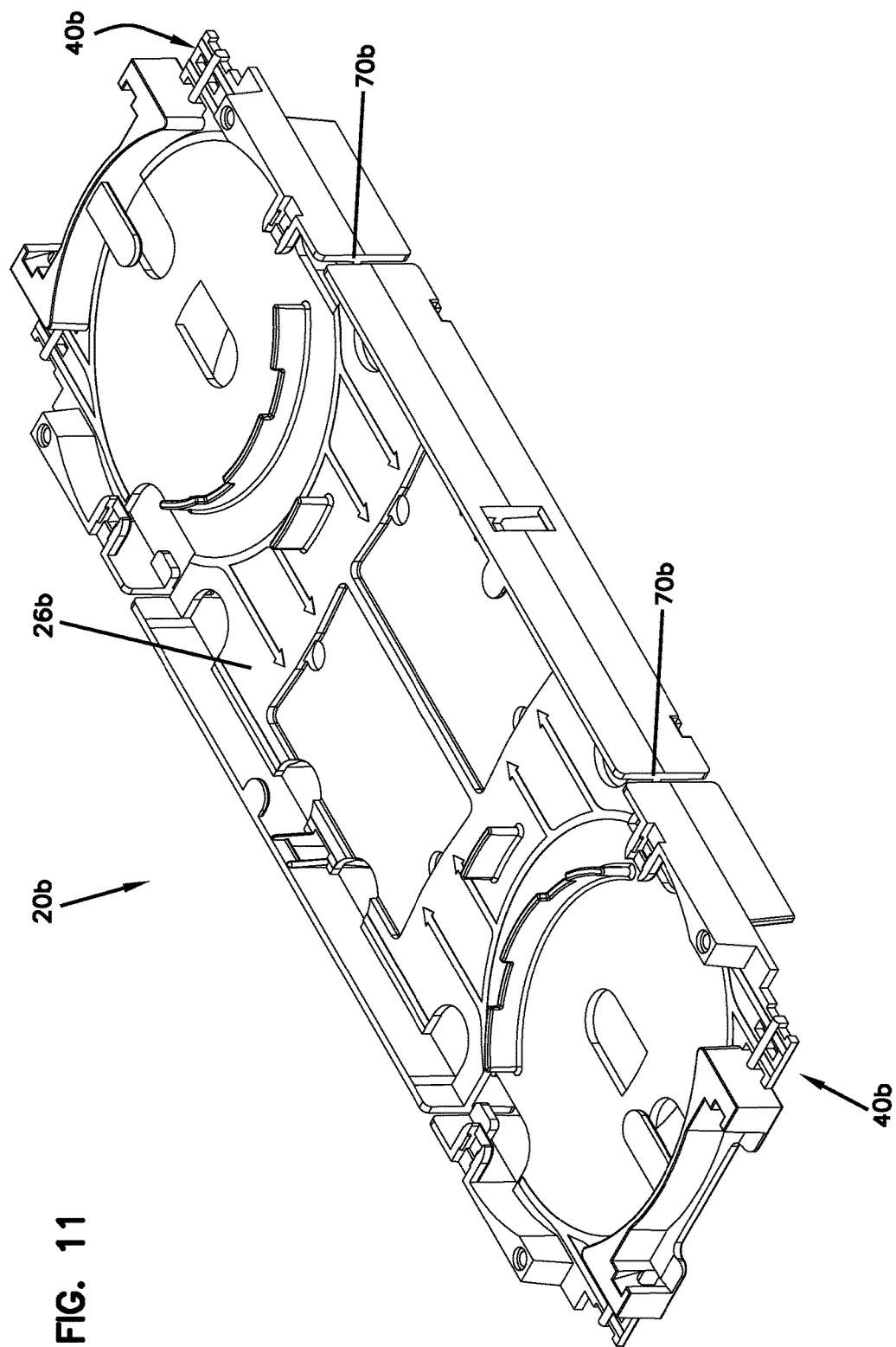
FIG. 11 is a perspective view showing a top side of a further fiber management tray in accordance with the principles of the present disclosure.
Figure 12:
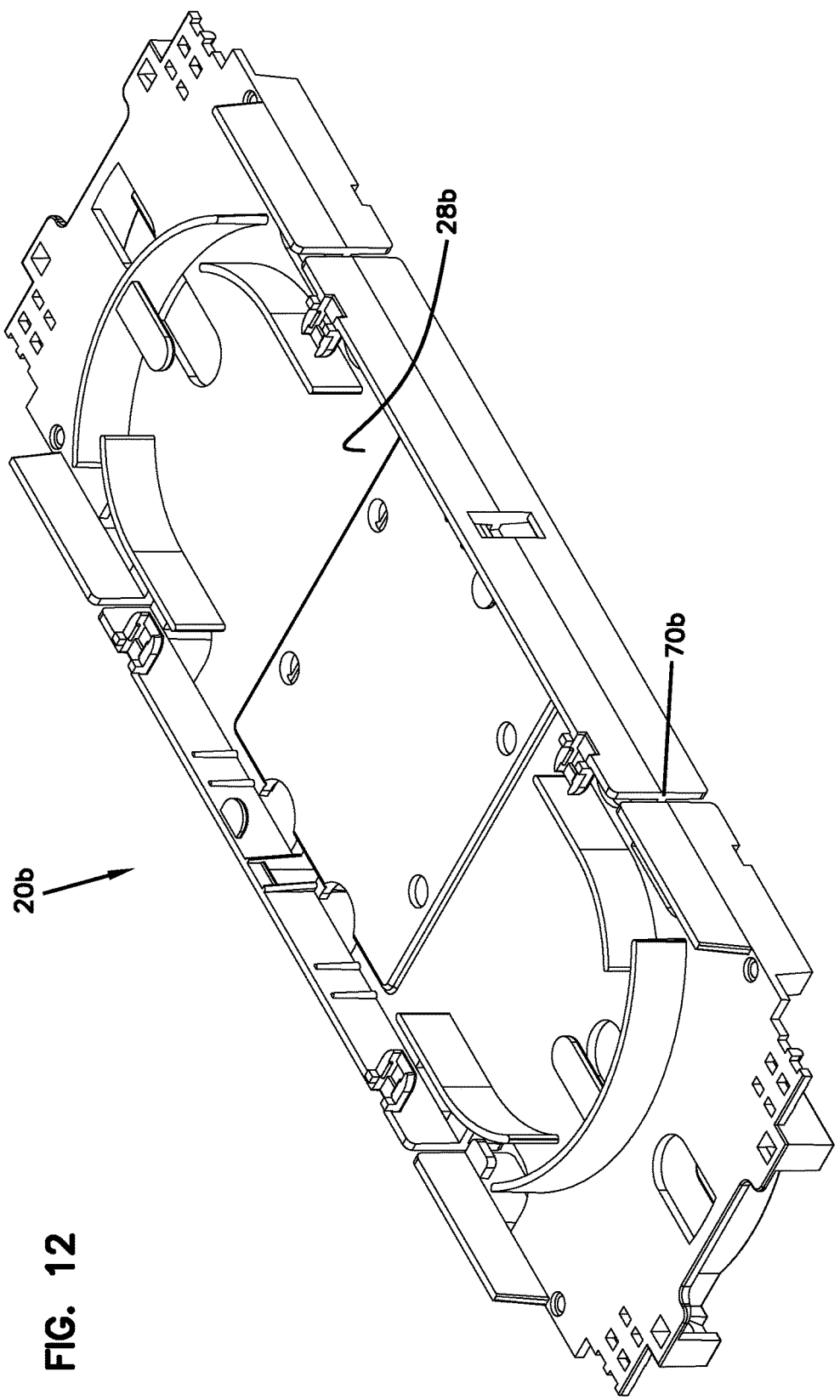
FIG. 12 is a perspective view showing a bottom side of the fiber management tray of FIG. 11.
Figure 15:
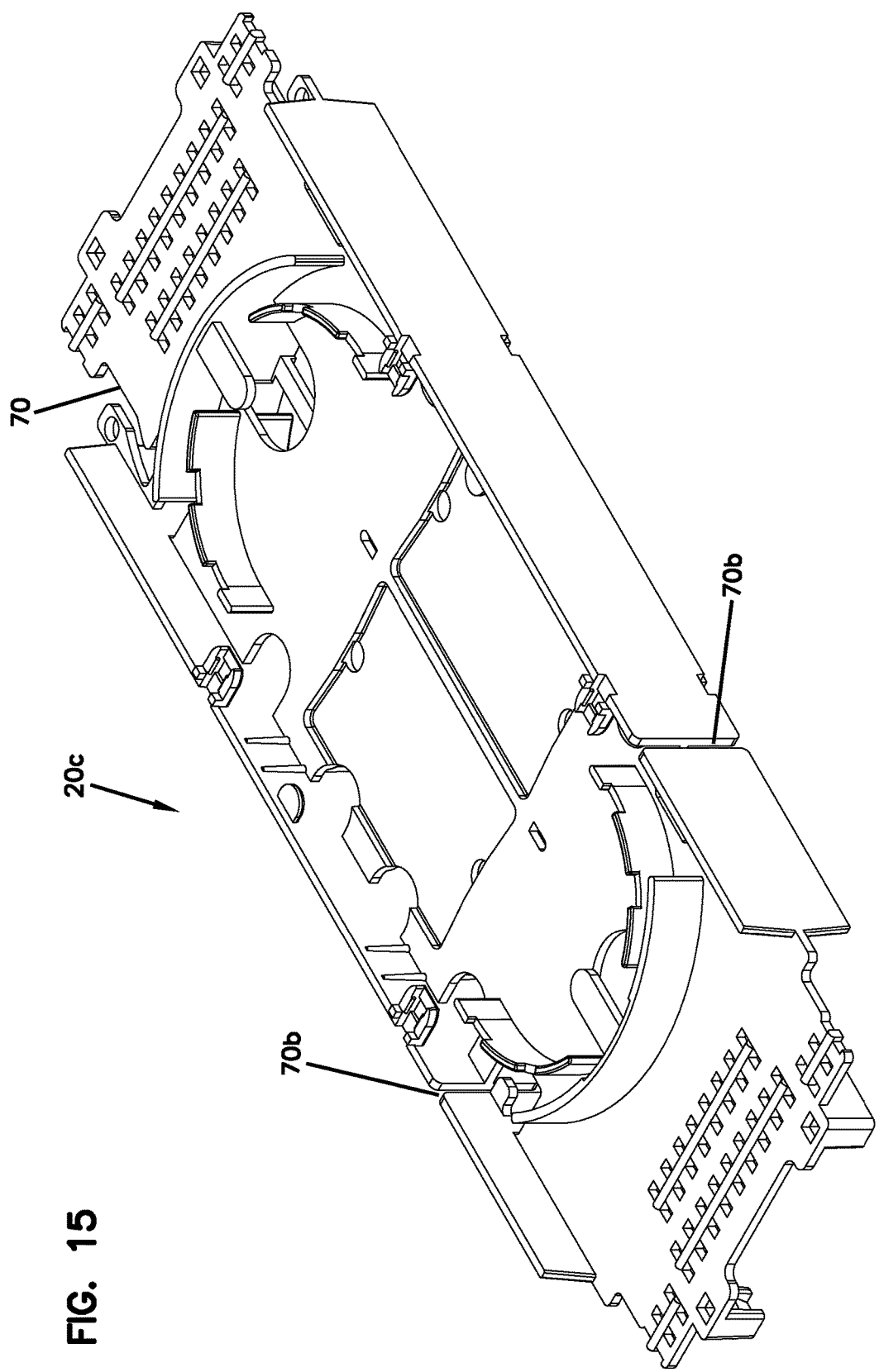
FIG. 15 is a perspective view showing a top side of a further fiber management tray in accordance with the principles of the present disclosure.
Figure 16:
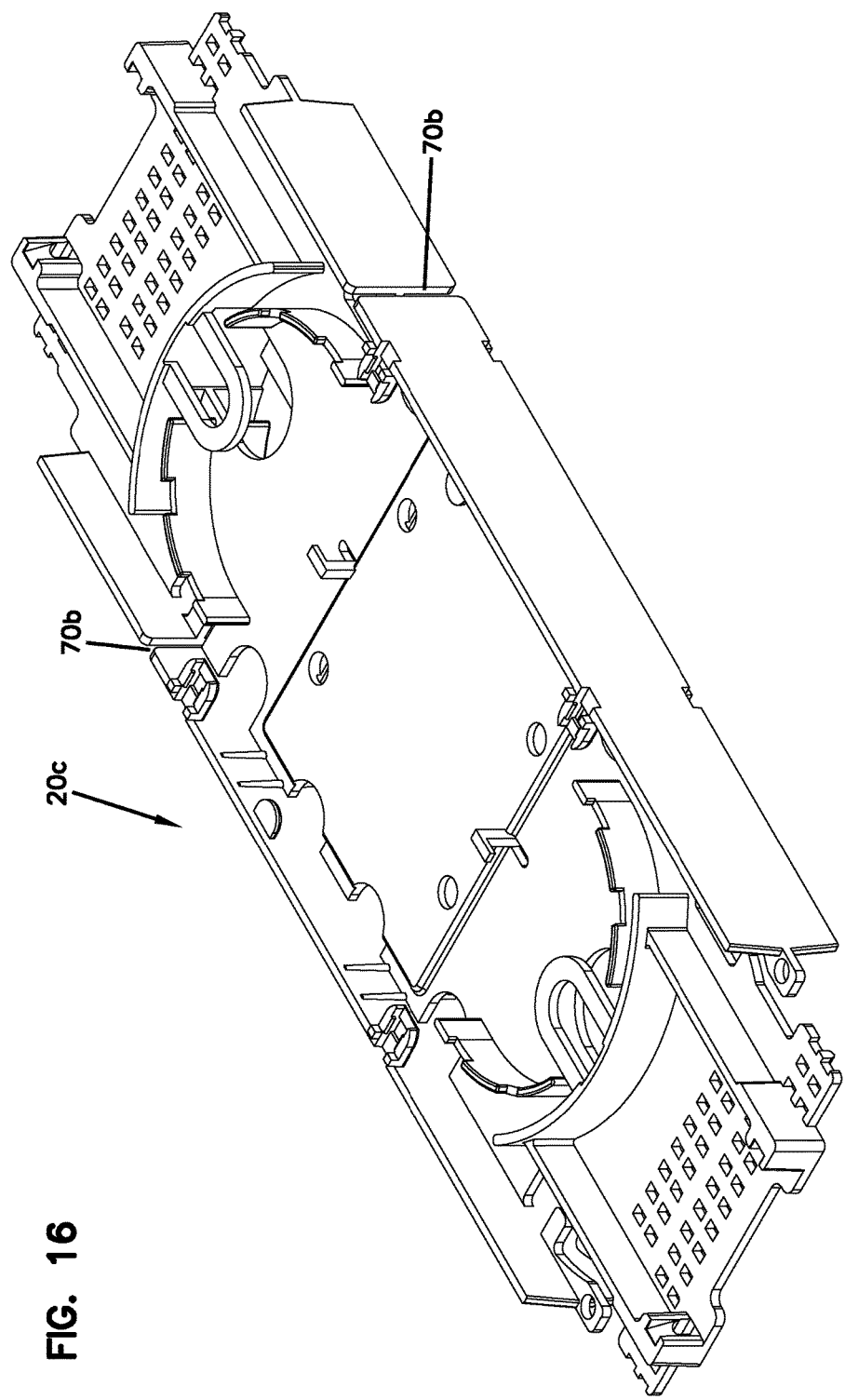
FIG. 16 is a perspective view showing a bottom side of the fiber management tray of FIG. 15.
Figure 17:
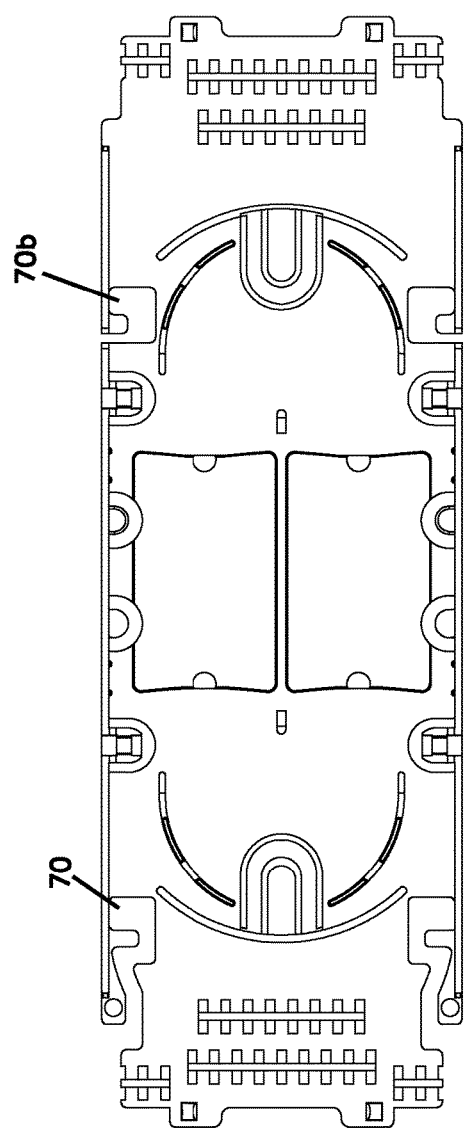
FIG. 17 is a plan view showing the top side of the fiber management tray of FIGS. 15 and 16.
Figure 18:
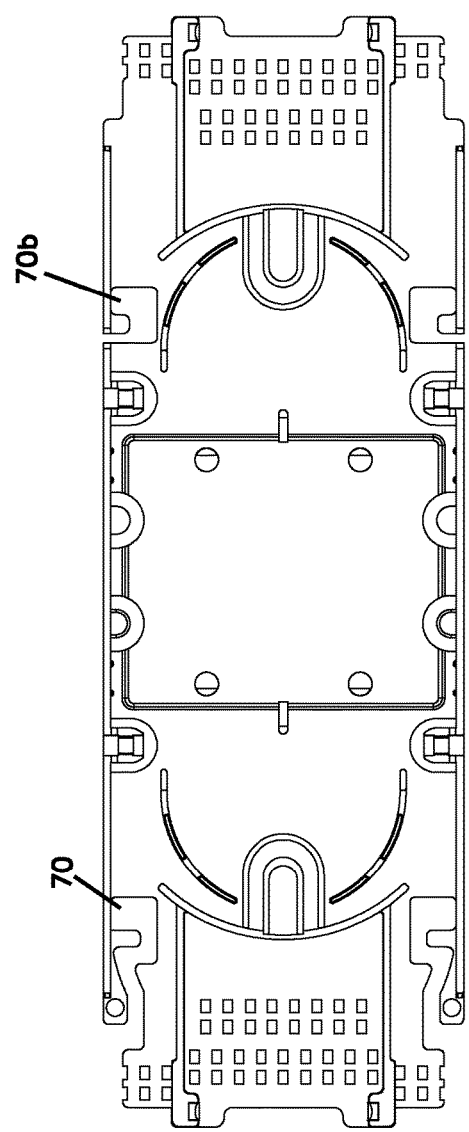
FIG. 18 is a plan view showing the bottom side of the fiber management tray of FIGS. 15 and 16.
Figure 19:
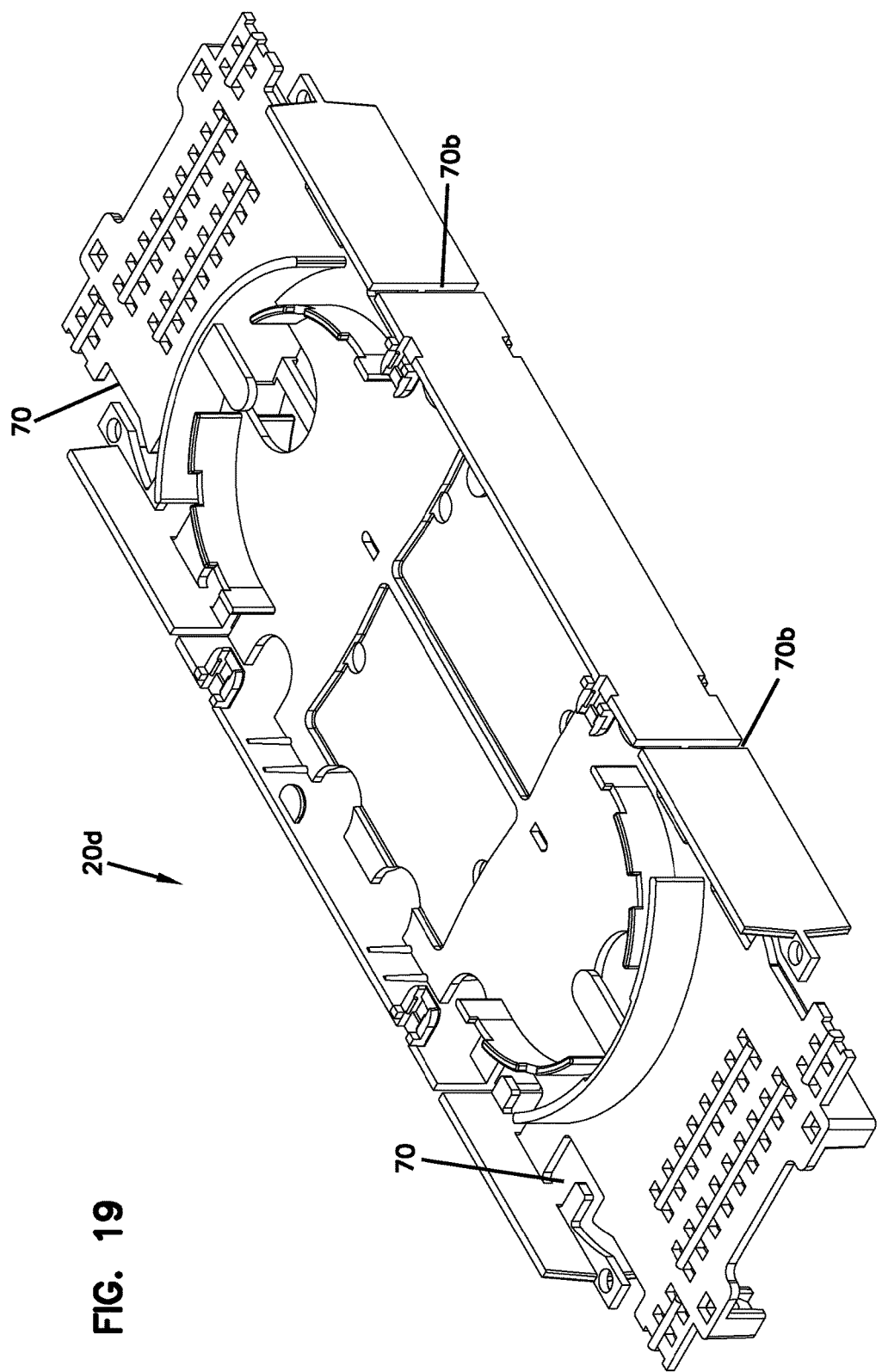
FIG. 19 is a perspective view of a top side of still another fiber management tray in accordance with the principles of the present disclosure.
Figure 20:
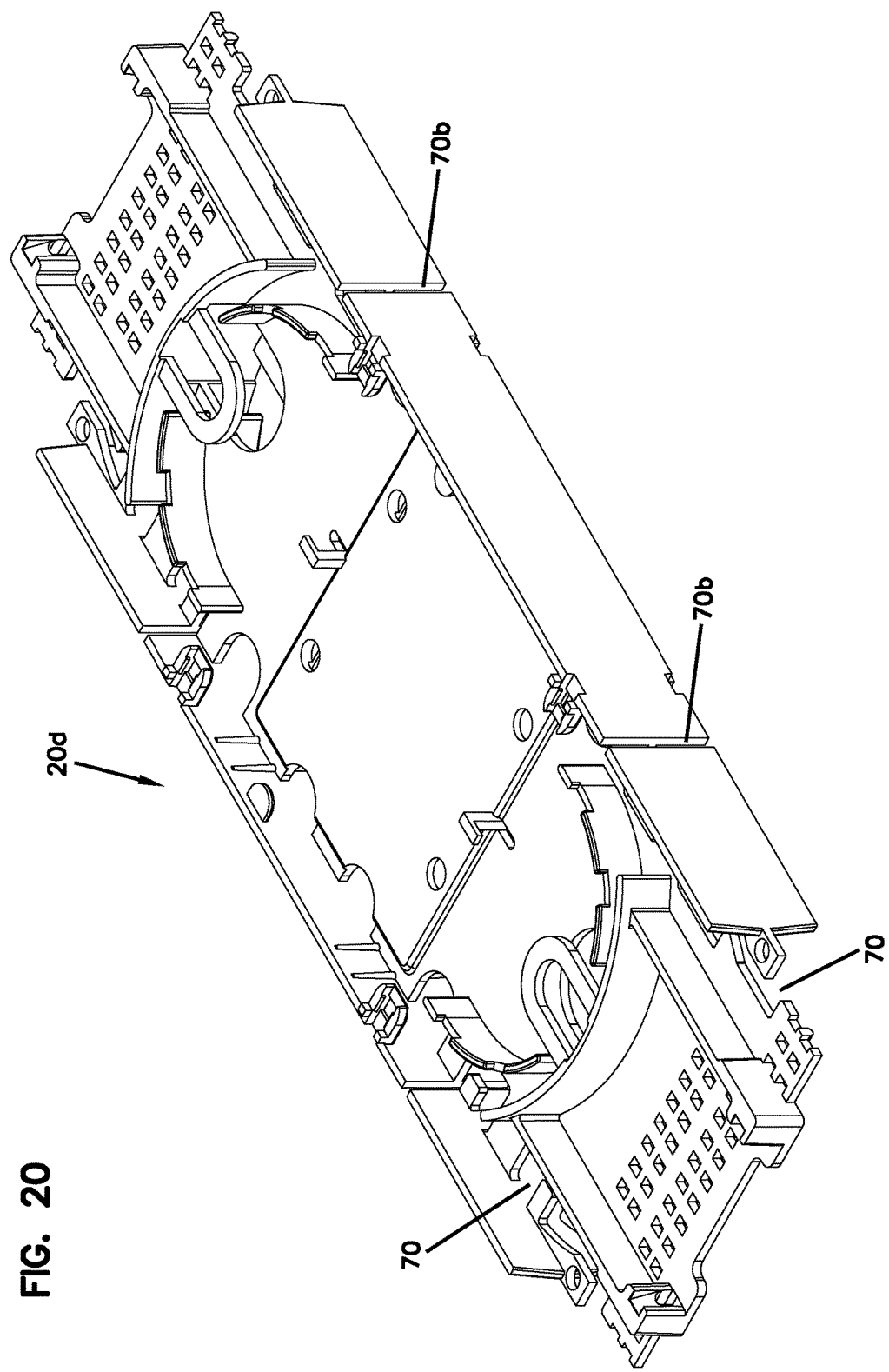
FIG. 20 is a perspective view showing a bottom side of the fiber management tray of FIG. 19.
Figure 21:
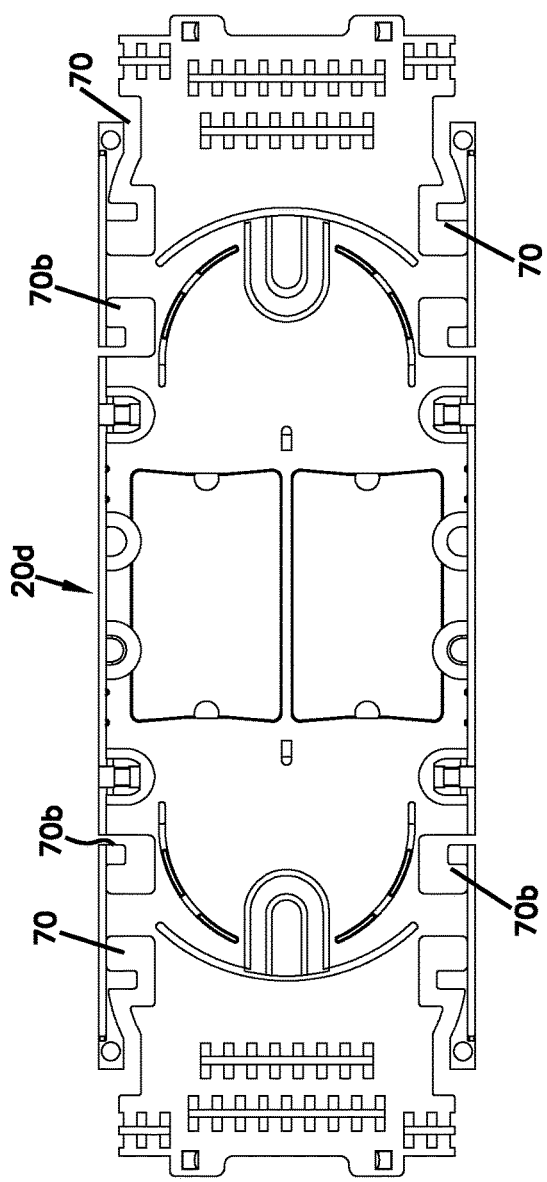
FIG. 21 is a plan view showing the top side of the fiber management tray of FIGS. 19 and 20.
Figure 22:
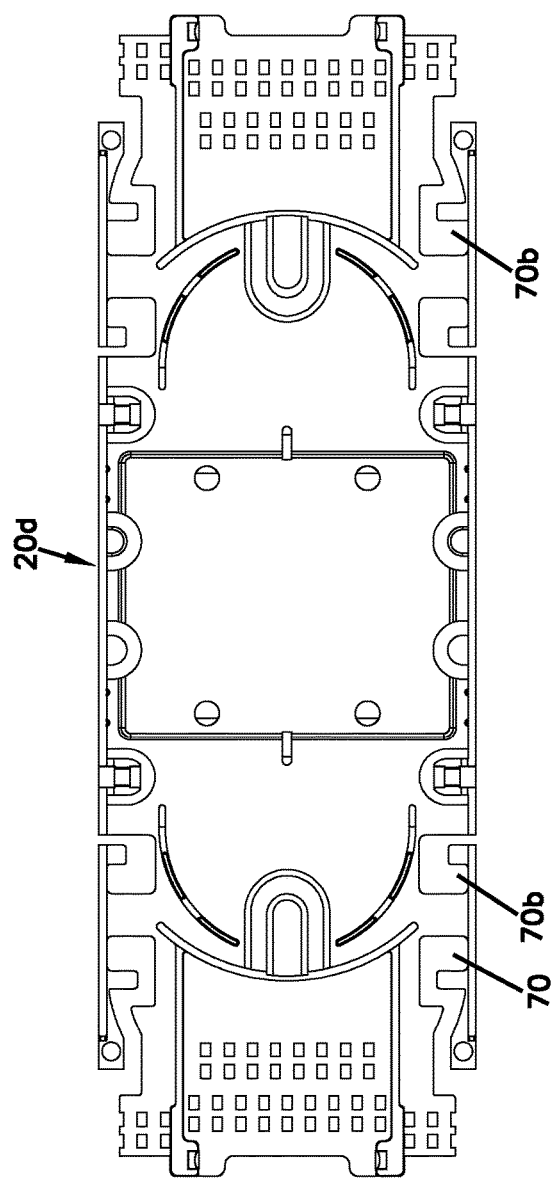
FIG. 22 is a plan view showing the bottom side of the fiber management tray of FIGS. 19 and 20.
Figure 23:
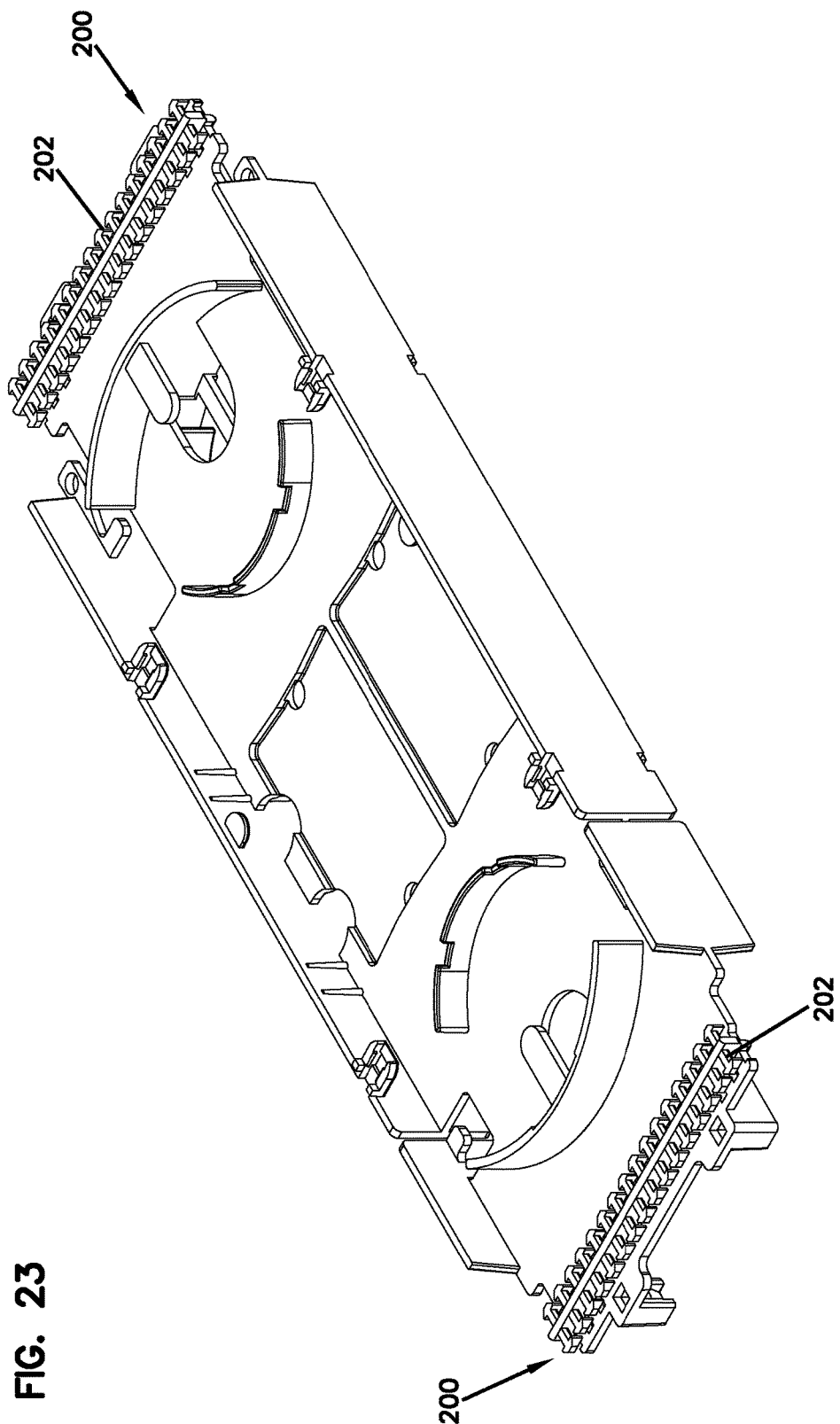

The fiber management tray 20 has a top side 26 (see FIGS. 1 and 3) and a bottom side 28 (see FIGS. 2 and 4). The top side 26 can also be referred to as a front side and the bottom side 28 can also be referred to as a back side. The top and bottom sides 26, 28 may also be referred to as first and second sides.

The fiber management tray 20 includes first and second ends 30, 32 separated by the length L of the fiber management tray 20. In certain examples, the first and second ends 30, 32 can each include pivot mounts 34 (FIG. 2) for allowing either of the ends 30, 32 to be pivotally connected to another structure such as a fiber optic terminal (e.g., a fiber optic splice terminal or other type of housing/enclosure). Mounting tabs 36 can also be provided adjacent the opposite first and second ends 30, 32 of the fiber management tray 20. The mounting tabs 36 can define fastener openings 38 (FIGS. 3 and 4) for using fasteners used to secure the fiber management tray 20 to a structure such as a terminal.

The fiber management tray 20 can also include buffer tube fixation regions 40 (i.e., anchoring regions) located adjacent each of the first and second ends 30, 32. The buffer tube fixation regions 40 can be configured for securing or otherwise attaching buffer tubes corresponding to pass-through cables and/or drop cables to the fiber management tray 20. In certain examples, the fixation regions 40 can include structures for allowing buffer tubes to be clamped, tied, bound or otherwise attached to the fiber management tray 20. In certain examples, the fixation regions 40 can include structures for receiving ties. In the depicted example, the fixation regions 40 include sets of openings 48 defined through a tray main body 24 for receiving ties (see FIG. 3). In other examples, separate structures (e.g., members, rods, flanges, braces, etc.) can be attached to the tray and used to provide attachment points for secure buffer tubes to the tray via ties. In this way, the number of holes through the tray can be reduced to increase the strength of the tray.

FIGS. 23-26 show an alternative anchoring configuration 200 having anchoring bars 202 that connect to the front/top of the main body of a fiber management tray 200. In one example, the anchoring bars 202 connect to the main body of the tray by a snap-fit connection. The anchoring bars 202 include main support members 204 (i.e., main beams) that extend across the width of the tray and tie-down location members 206 (i.e., cantilevers) that project outwardly from the main support members 204. The tie-down location members have lengths that extend along the length of the tray. In use, ties are routed under the tie-down members and used to strap/affix buffer tubes corresponding to drop cables to the tie-down members 206. Sets of openings 208 through the main body of the tray can receive ties used to secure buffer tubes receiving the optical fibers of through-cables to the bottom/back side of the tray. As used herein, a buffer tube is a tube that receives and protects at least one optical fiber.

Referring back to FIGS. 1-4, as previously described, the fiber management tray 20 includes a top side 26 and a bottom side 28. The tray main body 24 having a top surface 42 at the top side 26 of the fiber management tray 20 and a bottom surface 44 at the bottom side 28 of the fiber management tray 20.

The top side 26 of the fiber management tray 20 is configured for storing, protecting, and routing optical fiber. For example, the top side 26 can include structure that defines one or more fiber routing paths. In certain examples, the fiber routing paths can define one or more fiber loops. In certain examples, the fiber routing paths can include a fiber management loop 27 that is elongated along the length L of the fiber management tray 20 so as to have a racetrack-type configuration.

Referring to FIGS. 1 and 3, top side 26 includes various structures that project upwardly from the top surface 42 of the main tray body 24 and that cooperate to define a protected fiber management path (e.g., a fiber management loop) at the top side 26 of the fiber management tray 20. For example, the top side 26 of the fiber management tray 20 includes side walls 50 that project upwardly from the top surface 42 of the main tray body 24. The side walls 50 can be generally parallel to one another and are positioned at opposite sides of the fiber management tray 20. In the depicted examples, the side walls 50 extend along the length L of the fiber management tray 20 and define portions of a perimeter of the fiber management tray 20. The top side 26 also includes end walls 52 that are positioned near the first and second ends 30, 32 of the fiber management tray 20 and that extend generally across the width W of the fiber management tray 20. The end walls 52 are curved and project upwardly from the top surface 42 of the main tray body 24. The end walls 52 function as fiber guides and have curvatures compatible with minimum bend radius requirements of the fibers intended to be managed on the fiber management tray 20. The end walls 52 define curved ends of the fiber management loop 27 defined by the top side 26 of the fiber management tray 20 and the side walls 50 define opposite sides of the fiber management loop 27.

The fiber management loop 27 is also defined by inner fiber guide walls 54. The inner fiber guide walls 54 project upwardly from the top surface 42 of the main tray body 24 and include portions that oppose the side walls 54 and portions that oppose the end walls 52. The end walls 52 and the inner fiber guide walls 54 cooperate to define curved end channels 56 located at opposite ends of the loop 27. The top side 26 of the fiber management tray 20 can also include structure for assisting and retaining fibers in the loop 27. For example, tabs 58 project from the end walls 52 and oppose the top surface 42 and tabs 60 project inwardly from the side walls 50 and oppose the top surface 42. The tabs 58, 60 extend over fibers routed along the fiber management loop 27 so as to retain the fibers in the tray. Splice holder mounting locations 80 (e.g., receptacles) are provided for receiving and retaining splice holders used to hold splice sleeves that protect fusion splices between drop cables and fibers of a through cable.

Referring to FIGS. 2 and 4, the bottom side 28 of the fiber management tray 20 also includes a fiber management configuration for routing and storing optical fiber thereon. For example, the bottom side 28 of the fiber management tray 20 can include one or more optical fiber routing paths defined by one or more fiber guides, fiber guide walls, fiber guide channels, or other structures. In the depicted embodiment, the bottom side 28 of the fiber management tray 20 defines a fiber management path in the form of a fiber management loop 29 similar to the fiber routing loop 27 provided at the top side 26 of the fiber mounting tray 28. For example, the bottom side 28 includes opposing side walls 62 that project downwardly from the bottom surface 44 of the main tray body 24 and extend along the length L of the fiber management tray 20. In the depicted example, the side walls 62 are generally parallel and form opposite elongated sides of the fiber management loop path 29 provided at the bottom side 28 of the fiber management tray 20. The bottom side 28 of the fiber management tray 20 also includes end walls 64 that project downwardly from the bottom surface 44 of the main tray body 24. The end walls 64 extend across the width W of the fiber management tray 20 and define opposite ends of the fiber management loop path 29. Inner fiber guide walls 66 project downwardly from the bottom surface 44 of the main tray body 24 and include portions that oppose the end walls 64 and portions that oppose the side walls 62. In this way, the inner fiber guide walls 66 and the end walls 64 define curved end channels that delineate curved end portions of the fiber management loop 29. The inner fiber guide walls 66 and the side walls 62 also define channel portions that extend along the sides of the fiber management loop 29. A central platform 61 is provided for mounting optical components such as passive optical components (e.g., passive optical power splitters and wavelength division multiplexers). Hooks 63 can be provided for managing partial fiber loops.

The fiber management tray 20 further includes routing transition structures for transitioning optical fibers between the top and bottom sides 26, 28. In certain examples, the structures can have a "wraparound" configuration. Such a configuration allows optical fibers to be laterally inserted therein without requiring free ends of the optical fibers to be axially threaded through the structure. Referring to FIGS. 1-4, routing transition structures in the form of routing transition openings 70 are defined through the tray main body 24 for routing optical fibers between the top and bottom sides 26, 28 of the fiber management tray 20. The routing transition openings 70 are located adjacent the first and second ends 30, 32 of the fiber management tray 20 and each include laterally open portions 72 for allowing fibers to be laterally inserted into the openings 70. As depicted, the laterally open portions 72 are shown at the outer perimeter of the fiber management tray 20. As depicted, the routing transition opening 70 includes a main region 74 for receiving optical fibers transitioned between the top and bottom sides 26, 28 of the fiber management tray 20, and an access portion 76 that allows the fibers to be laterally inserted into the main portion 74. The access portion 76 is depicted as a slot having an open end at the periphery of the fiber management tray 20. The open end of the access portion 76 coincides with the laterally open portion 72.

It will be appreciated that directional terms such as top, bottom, upwardly, downwardly and like terms are used for description purposes only. It will be appreciated that in use, trays in accordance with the principles of the present disclosure can be mounted in any orientation.

When mounted within a terminal, in certain examples, a first side of the fiber management tray (e.g., the top side 26) is more accessible than a second side (e.g., the bottom side 28) of the fiber management tray 20. For example, the tray 20 can be pivotally mounted to the terminal with the first side facing outwardly from a wall (e.g., the bottom of the enclosure or a side wall of the enclosure) while the second side faces toward the wall of the enclosure. In certain examples, the fiber management tray 20 can be pivotally mounted to the terminal and can be configured such that the first side of the fiber management tray 20 is readily accessible in a first pivot position, while the second side can only be accessed by pivoting the fiber management tray 20 relative to the terminal from the first position to a second position where the second side can be accessed. Normally, the fiber management tray 20 is in the first position. In certain examples, the tray 20 can pivot at least 180 degrees between the first and second positions. In certain examples, positive stops can be provided for positively stopping pivotal movement of the tray 20 at the first pivot position and at the second pivot position.

In certain examples, management of optical fibers of a multi-fiber cable that are intended to be spliced to drop cables is performed at the more accessible side of the fiber management tray 20 (e.g., the top side 26) and management of the remainder of the optical fibers of the multi-fiber cable is performed at the less accessible side (e.g., the bottom side 28) of the fiber management tray 20. In certain examples, passive optical components (e.g., optical power splitters, wavelength division multiplexers, and other structures) can be mounted at the less accessible side (e.g., the bottom side 28) of the fiber management tray 20. In certain examples, pass-through fibers are managed at the less accessible side of the tray 20 and fibers intended to be accessed and spliced to drop cables are managed at the more accessible side of the tray. In certain examples, an optical fiber from the main multi-fiber cable can be accessed at the mid-span access location and spliced at the bottom side of the tray to an optical component such as a passive optical power splitter or wave division multiplexer device. Outputs of the optical component can be routed to the top side of the tray for splicing to drop cables. Outputs of the optical component can also be spliced at the bottom side of the tray to optical fibers of the mid-span access cable for forward feeding and/or back feeding signals through the main fiber optic cable.

It will be appreciated that the fiber management tray 20 is particularly well suited for use in managing optical fibers for pass-through and splicing applications. A typical fiber pass-through configuration includes a fiber optic cable having a mid-span portion that is managed by the fiber management tray 20. In such an example, the cable has a jacket containing a plurality of optical fibers (e.g., 12 optical fibers). Generally, the jacket is stripped away from the optical fibers at the mid-span location and the fiber management tray 20 is used to manage the optical fibers at the mid-span location. In this way, the fiber management tray 20 protects and manages the optical fibers that are not protected by a cable jacket. The jacketed ends of the cable on opposite ends of the mid-span location are preferably anchored to a housing that encloses the tray 20 and the optical fibers between the jacketed ends of the cables are managed on the fiber management tray 20. Buffer tubes can be used to protect the optical fibers as the optical fibers extend from the jacketed ends of the multi-fiber cable to the tray 20. The ends of the buffer tubes corresponding to the optical fibers of the multi-fiber optical cable are typically anchored at the bottom side 28 of the fiber management tray 20.

A sub-set of the total number of fibers of the cable are routed from the bottom side 28 of the fiber management tray 20 through one of the routing transition structures 70 to the top side 26 of the fiber management tray 20. At the top side 26 of the fiber management tray 20, the first sub-set of optical fibers is routed about the looped fiber management path 27 provided at the top side 26 of the fiber management tray 20. The optical fibers not routed to the top side 26 of the fiber management tray 20 form a second sub-set of the optical fibers of the fiber optic cable. The second sub-set of optical fibers are managed at the bottom side 28 of the fiber management tray 20. For example, the second sub-set of optical fibers are arranged in a loop around the fiber management loop path 29 provided at the bottom side 28. As so configured, the fibers of the second sub-set of optical fibers are adapted to function as pass-through fibers that pass from the first section of optical cable, through the fiber management tray 20, to the second section of fiber optic cable without splicing or any other type of interruption. The first sub-set of optical fibers provided at the top side 26 of the fiber management tray 20 are available for ready splicing to drop cables. For example, ends of buffer tubes corresponding to drop cables can be anchored to the top side 26 of the fiber management tray 20 at the fixation regions 40. The first sub-set of optical fibers can be cut and spliced to the fibers of the drop cables at the top side 26 of the fiber management tray 20. Splice holders for holding fusion splices (e.g., splice sleeves) between the fibers of the first sub-set of cable fibers and the drop cable fibers can be mounted at the top side 26 of the fiber management tray 20. For example, the splice holders can be mounted at the splice holder mounting locations 80 positioned inside the boundary defined by the looped fiber storage path 27.

Referring to FIGS. 3 and 4, a cable 100 having a jacket 102 and a plurality of optical fibers 104 is depicted. A portion of the jacket 102 has been removed to form a mid-span access location 106 of the cable 100. The mid-span access location 106 is positioned between a first jacketed section 100a of the cable 100 and a second jacketed section 100b of the cable 100. Ends of the first and second jacketed sections 100a, 100b can be anchored to a housing that encloses the tray 20. The ends of buffer tubes 101 that protect the optical fibers 104 as the optical fibers 104 extend from the jacketed sections 100a, 100b of the cable 100 to the tray 20 can be anchored to the fiber management tray 20 at the fixation region 40 adjacent the first end 30 of the fiber management tray 20. In the depicted example, ties are used to anchor the ends of the buffer tubes 101 to the fiber management tray 20. Unbuffered portions of the optical fibers 104 corresponding to the mid-span access location 106 can be managed by the fiber mounting tray 20. For example, a first subset 108 of the optical fibers 104 (e.g., four optical fibers) are routed through the routing transition opening 70 to the top side 26 of the fiber management tray 20. In certain examples, the first subset 108 of optical fibers can be managed at the bottom side 28 of the fiber management tray 20 (e.g., wrapped in a few loops about the looped cable management path 29 of the bottom side 28) prior to routing the first subset of optical fibers 108 through one of the routing transition openings 70 to the top side 26 of the fiber management tray 20. At the top side 26 of the fiber management tray 20, the first subset 108 of the optical fibers 104 can be routed along the looped cable management path 27 provided at the top side 26 of the fiber management tray 20. Thereafter, the first subset 108 of optical fibers 104 can be routed back from the top side 26 to the bottom side 28 through one of the transitional openings 70. Thereafter, the first subset 108 of optical fibers 104 can be routed directly to the second jacketed section 100b of the cable 100 or can be managed further at the bottom side 28 of the fiber management tray 20 before being routed to the second jacketed section 100b of the cable 100.

The remainder of the optical fibers 104 not routed to the top side 26 of the fiber management tray 20 form a second subset 110 of the optical fibers 104 and are managed at the bottom side 28 of the fiber management tray 20. For example, the second subset 110 of optical fibers 104 can be routed along the looped fiber management path 29 defined by the bottom side 28 of the fiber management tray 20. After looping about the fiber management path 29 of the bottom side 28 of the fiber management tray 20, the second subset 110 of optical fibers 104 is routed to the second jacketed section 100b of the cable 100. In certain examples, the jacketed section 100a is an upstream section of the cable 100 and the second jacketed section 100b is a downstream section of the cable 100. The second subset 110 of optical fibers 104 is not routed to the top side 26 of the tray 20 for any management.

In the configuration of FIG. 3, the optical fibers 104 have been pre-installed on the fiber management tray 20 to facilitate the subsequent splicing of drop cables to the optical fibers. Specifically, the first subset 108 of optical fibers 104 have been pre-assigned as fibers suitable for being spliced to drop cables at the fiber management tray 20. In contrast, the second subset 110 of optical fibers 104 have been pre-assigned as pass-through fibers that merely pass through the mid-span access location 106 from the first jacketed section 100a of the cable 100 to the second jacketed section 100b of the cable 100 without being cut, spliced or otherwise accessed at the fiber management tray 20.

When it is desired to add a drop cable, a technician can access one of the optical fibers 104 of the first sub-set 108 at the top side 26 of the fiber management tray 20. Upon accessing the optical fiber 104 of the first sub-set 108, optical fiber 104 is cut and spliced to a corresponding optical fiber 120 of a drop cable 122 (see FIGS. 5 and 6). An end of a buffer tube 103 of the drop cable 122 can be anchored to the top side 26 of the fiber management tray 20 at one of the fixation regions 40. The splice can be protected within a splice sleeve 121 that is held within a splice holder 123. The splice holder can be mounted to the top side 26 of the fiber management tray 20.

The buffer tubes 101 can each enclose twelve optical fibers and the cable 100 can include more than one buffer tube 101. For example, the cable 100 can include two buffer tubes each containing twelve fibers with the ends of both buffer tubes 101 being anchored to the tray. Of course, cables having different numbers of fibers can be utilized and different counts of optical fibers can be managed by the top and bottom sides 26, 28 of the fiber management tray 20 without departing from the principles of the present disclosure.

In other examples, the fiber management tray 20 can be used to manage optical components (e.g., optical splitters, wavelength division multiplexers, or other components) and can also be configured to facilitate drop cable splicing. In one example, an optical component having splitting capabilities is mounted to the bottom side 28 of the tray 20. An optical fiber from a multi-fiber optical cable can be accessed at a mid-span access location of the multi-fiber cable and spliced to an input side of the optical component. The optical component can include a plurality of output fibers that receive split or otherwise separated signals from the input fiber. The split or otherwise separated signals can be split by optical power splitting or can be split based on wavelength. In one example, the optical component can provide a 1:8 split ratio, a 1:16 split ratio, or a 1:32 split ratio. At least some of the output fibers from the optical component can be routed from the bottom side 28 of the tray 20 to the top side 26 of the tray 20 so as to be readily accessible for splicing to drop cables at the top side of the tray. In certain examples, other fibers of the multi-fiber fiber optic cable can be used to distribute signals split at the optical component. For example, optical fibers of the multi-fiber fiber optic cable can be accessed (e.g., cut) at the mid-span access location 106 and spliced to the output fibers from the optical component at the bottom side 28 of the tray. In this way, it is possible to feed signals from the optical component from the tray 20 in a downstream direction through the downstream section of the multi-fiber fiber optic cable or in an upstream direction from the tray 20 through the upstream section of the multi-fiber fiber optic cable.

FIGS. 7-10 illustrate another fiber management tray 20a in accordance with the principles of the present disclosure. The fiber management tray 20a has the same basic configuration as the fiber management tray 20 except fixation regions 40a have been modified to include a staggered arrangement of tie openings configured for enhancing the density of buffer tubes supported by the fiber management tray 20a.

FIGS. 11-14 illustrate a further fiber management tray 20b in accordance with the principles of the present disclosure. Fiber management tray 20b has the same basic configuration as the fiber management tray 20. However, the fiber management tray 20 has fixation regions 40b that accommodate a fewer number of buffer tubes. Also, a loop path at a bottom side 28b of the fiber management tray 20b is elongated to occupy space previously occupied by anchoring locations in the earlier examples. Further, a fiber management arrangement at a top side 26b of the fiber management tray 20b includes an elongated fiber management loop path that extends substantially along the entire length of the fiber management tray 20b, and smaller, intermediate circular loop paths provided adjacent each end of the fiber management tray 20b.

Also, the fiber management tray 20b has an alternative routing transition structure 70b for transitioning optical fibers between the top and bottom sides 26b, 28b of the fiber management tray 20b. For example, the alternative transition structure 70b is defined through the side walls of the fiber management tray 20. For example, the transition structures include main portions 74b defined through the main tray bodies and access portions 76b that extend through the side walls. The access portions 76b are open-ended and have open ends at the periphery of the tray.

FIGS. 15-18 show another fiber management tray 20c in accordance with the principles of the present disclosure. The fiber management tray 20c is similar to previously described trays except the fiber management tray 20c includes one pair of routing transition structures 70b through the side walls of the fiber management tray 20 and one pair of routing transition structures 70 located at the end of the fiber management tray 20c.

FIGS. 19-22 illustrate still another fiber management tray 20d in accordance with the principles of the present disclosure. The fiber management tray 20d is similar to previously described embodiments except the fiber management tray 20d includes sets of routing transitioning structures 70 at both ends of the fiber management tray 20d and two pairs of fiber transitioning structures 70b defined through the side walls at intermediate locations between the end fiber transition structures.

Figure 27:
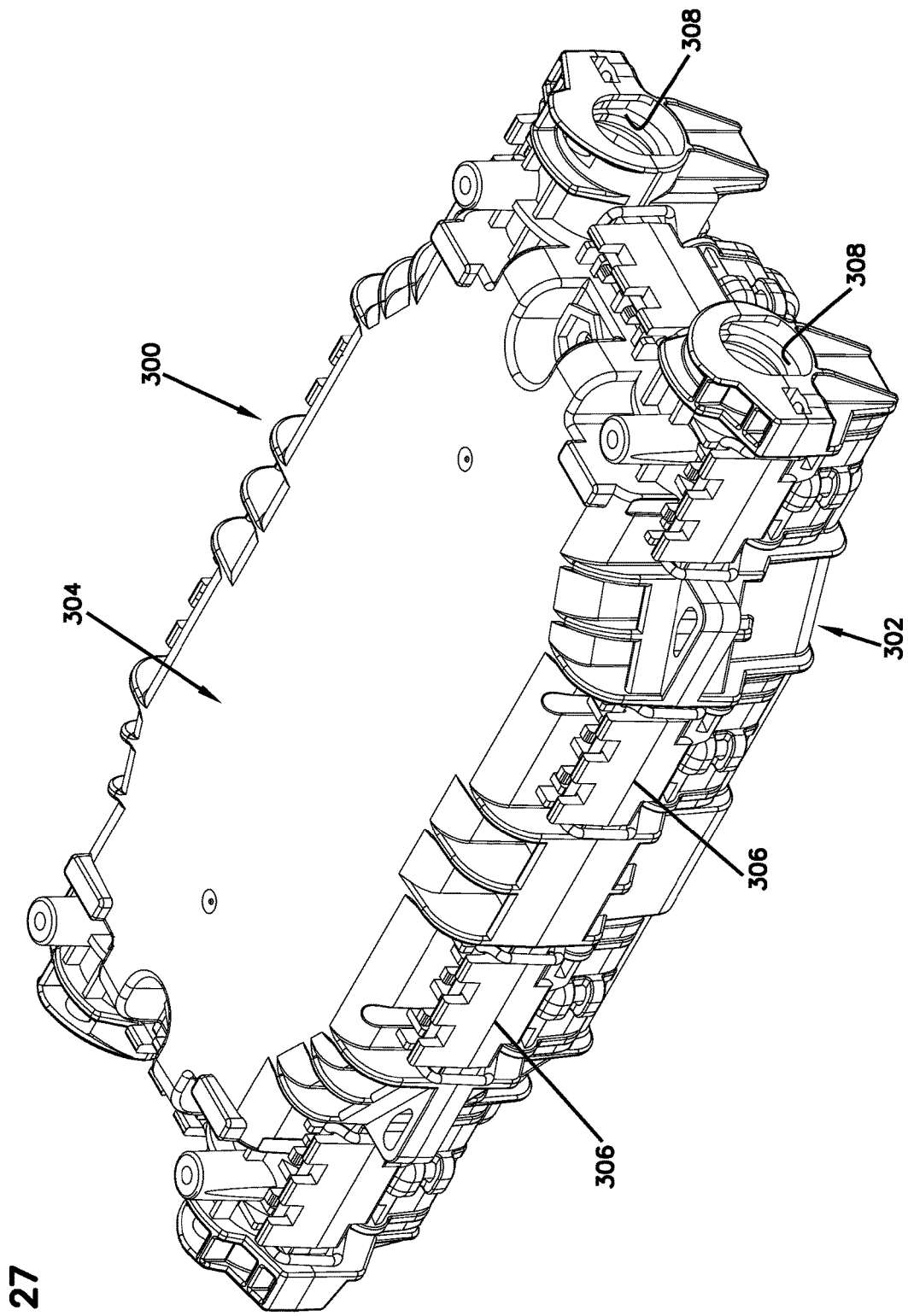
FIG. 27 illustrates a re-enterable, sealed enclosure suitable for housing fiber management trays in accordance with the principles of the present disclosure.
Figure 28:
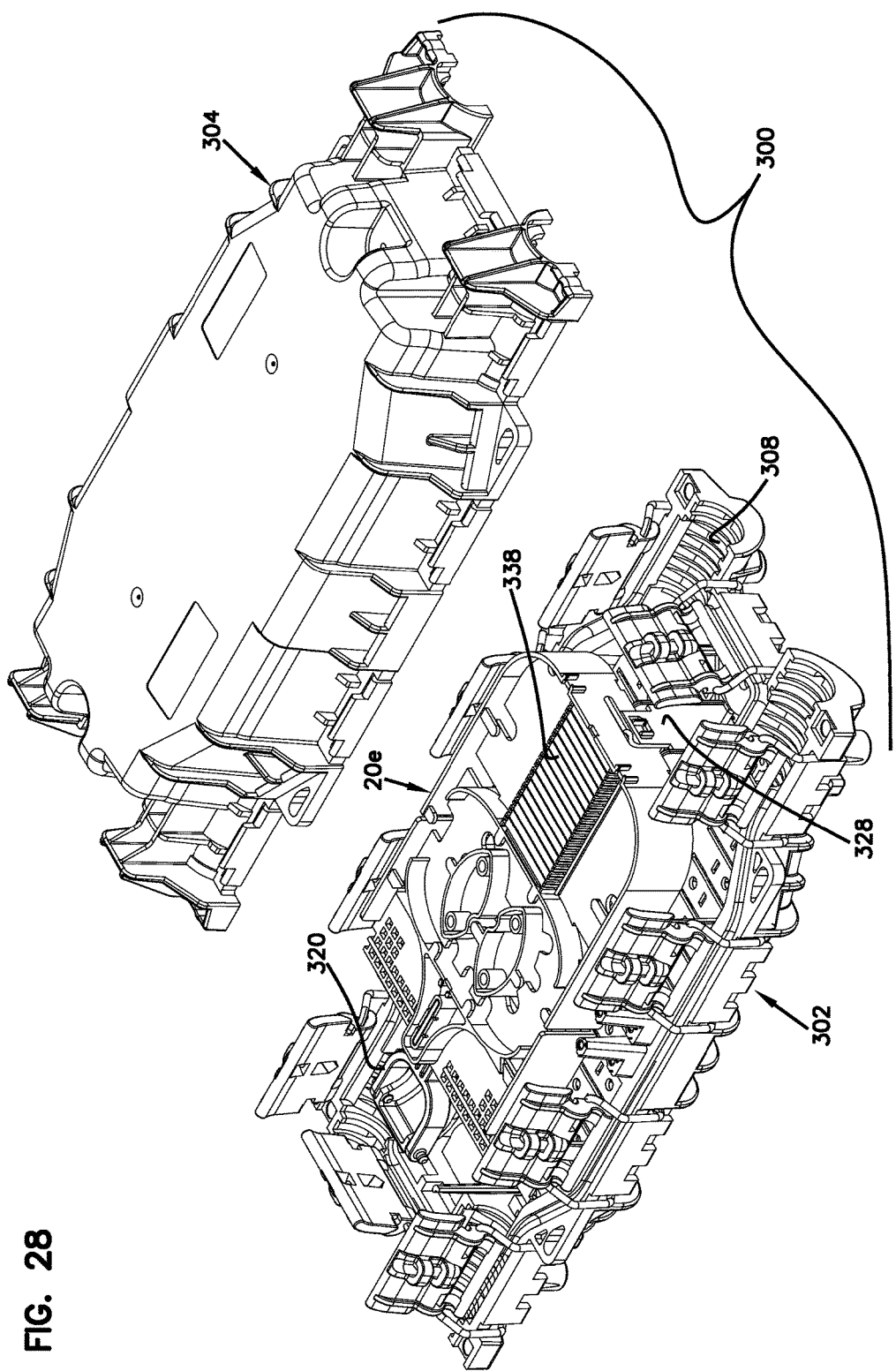
FIG. 28 illustrates the closure of FIG. 27 with a top cover removed to provide access to an interior of the closure.
Figure 29:
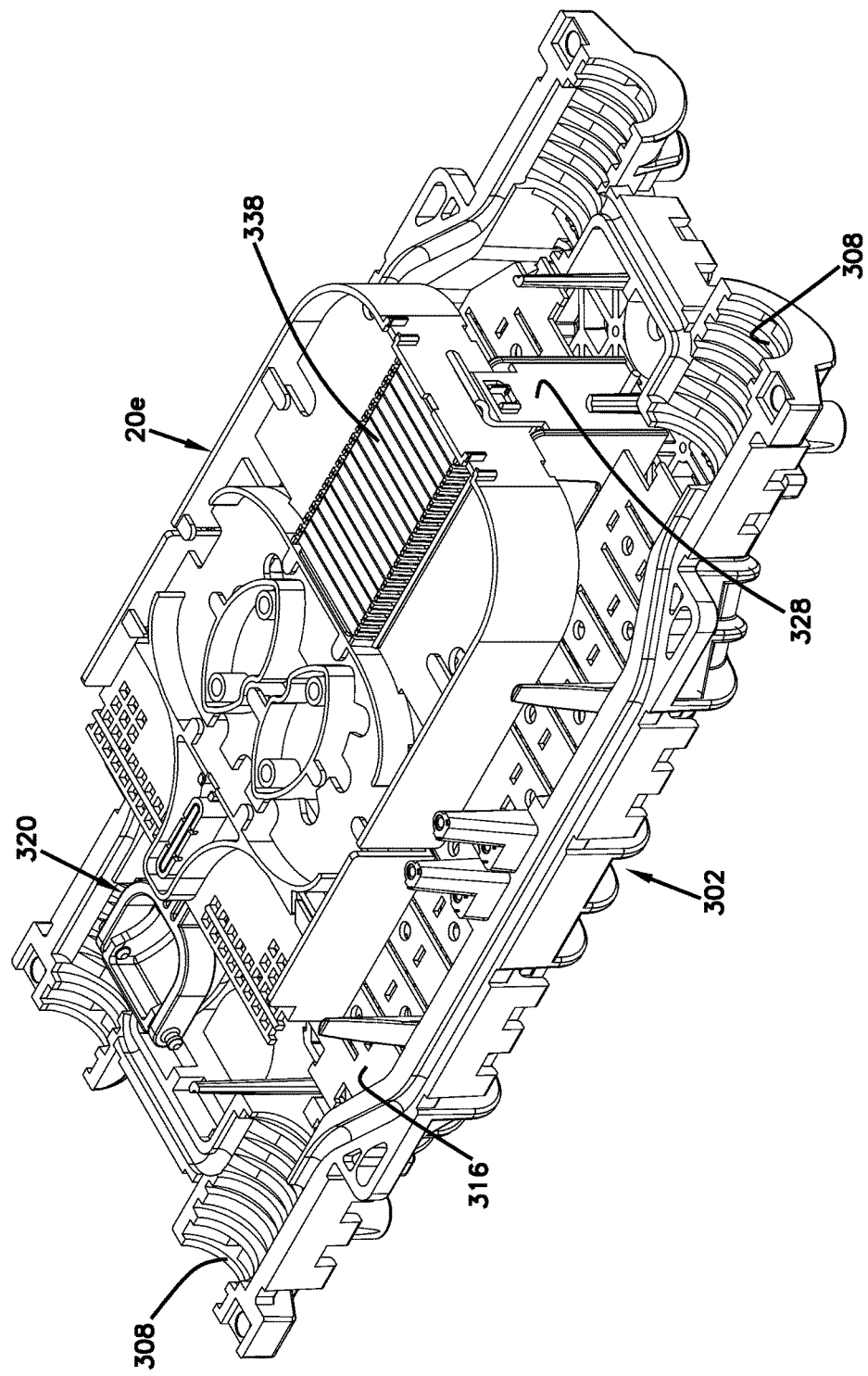
FIG. 29 is a perspective view showing a bottom half of the closure of FIG. 27.

FIGS. 27 and 28 illustrate a closure 300 that houses another fiber management tray 20e in accordance with the principles of the present disclosure. It will be appreciated that the closure 300 can be used to house any of the fiber management trays 20, 20a, 20b, 20c, 20d, 20e disclosed herein and can be used for accommodating various fiber routing configurations at the mid-span location of a multi-fiber fiber optic cable. The closure 300 includes a bottom portion 302 (e.g., a bottom half-portion) and a top portion 304 (e.g., a top half-portion). The bottom and top portions 302, 304 meet at a sealed interface that can be sealed by a perimeter gasket or other structure. The bottom and top portions 302, 304 can be clamped together via side clamps 306 (e.g., perimeter latches) that compress the bottom and top portions 302, 304 together to compress the gasket therein between for sealing. It will be appreciated that the side clamps 306 can be unlatched to provide access to the interior of the closure 300. Thus, the closure 300 is readily re-enterable.

Figure 30:
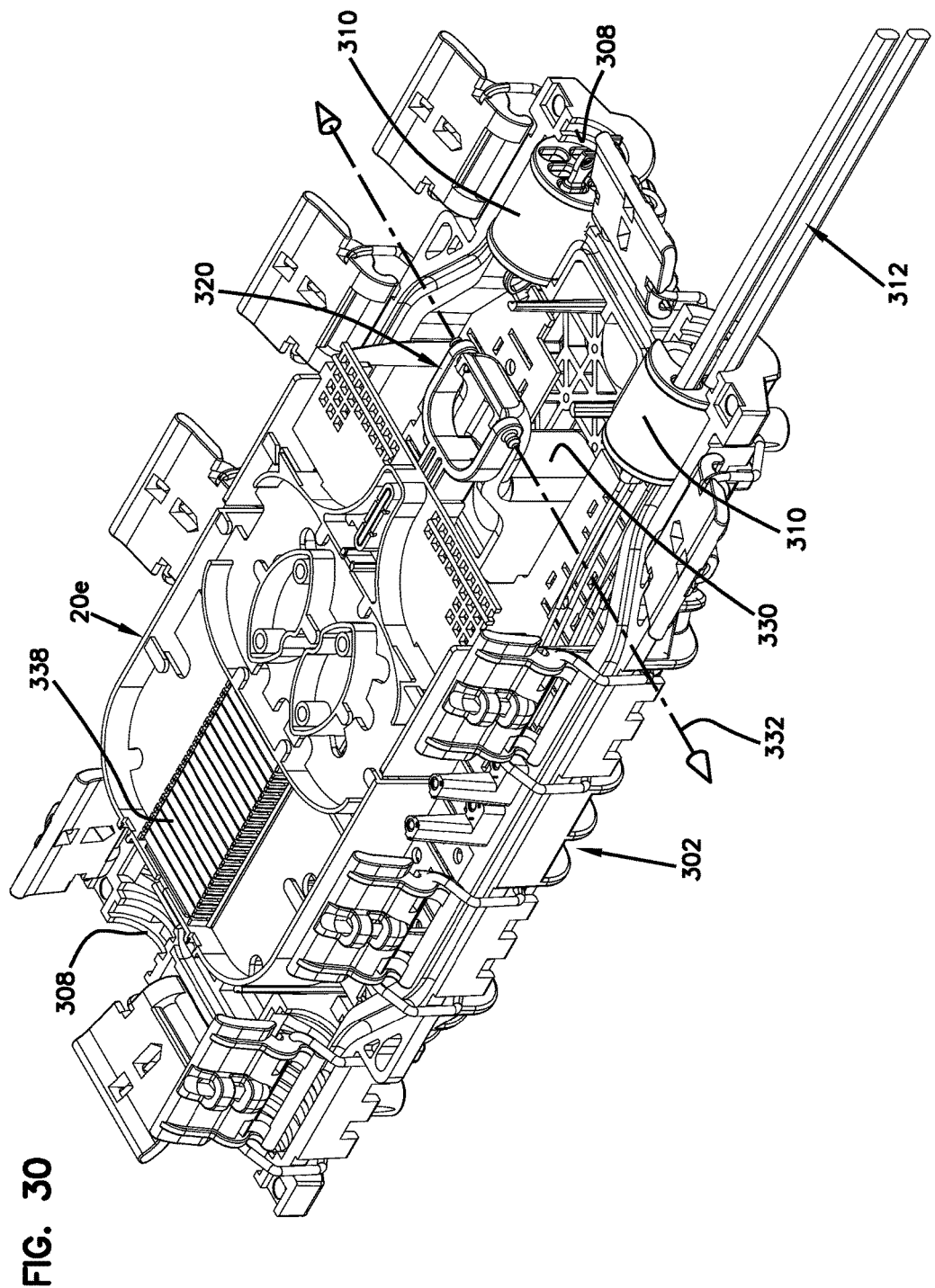
FIG. 30 illustrates an opposite end of the closure bottom half of FIG. 29 and also depicts drop cables routed through a sealing element provided at a port of the closure of FIG. 3.

Referring to FIGS. 27-30, the closure 300 includes four end ports 308 for allowing fiber optic cables to be routed in and out of the closure 300. The end ports 308 can be sealed by sealing components such as grommets 310. It will be appreciated that the sealing elements can have different configurations to accommodate different cable types and shapes. For example, the sealing elements can include larger holes for accommodating multi-fiber fiber optic cables and smaller holes for accommodating drop cables. Depending on the type of cable used, the sealing element can be various shapes such as round or elongated. When the holes are not being occupied by a cable, plugs can be used to seal the holes. As depicted at FIG. 30, the grommets 310 are configured for receiving a plurality of drop cables 312 having an elongated transverse cross-sectional profile.

As best shown at FIGS. 28-31, a fiber management and cable anchoring assembly 314 is housed within the closure 300. In the depicted example, the fiber management and cable anchoring assembly 314 is secured to the bottom portion 302 of the closure 300 and is readily accessible when the top portion 304 is removed from the bottom portion 302 of the closure 300. The fiber management and cable anchoring assembly 314 includes a cable anchoring plate 316, a tray mounting tower 318, a pivot arm 320 and the fiber management tray 20e. The cable anchoring plate 316 preferably has a robust construction (e.g., a metal construction) and can be fastened or otherwise secured to the bottom portion 302 of the closure 300. The tray mounting tower 318 attaches to the cable anchoring plate 316 such that the components can function as a unit. As depicted, a middle portion 322 of the tray mounting tower 318 mounts beneath the cable anchoring plate 316. The middle portion 322 can include attaching structures 324 for securing the cable anchoring plate 316 to the tray mounting tower 318. In certain examples, the attaching structures 324 can have a snap-fit configuration or can have a keyed configuration or other type of interconnect structure. In the depicted embodiment, the attaching structures 324 are cross-shaped and fit through corresponding openings 326 defined through the cable anchoring plate 316. Once the attaching structures 324 have been inserted through the openings 326, the tower 318 can be slid relative to the cable anchoring plate 316 to move the attaching structures 324 to a retaining position.

The cable anchoring plate 316 is configured for anchoring fiber optic cables to the closure 300. In certain examples, strength members of fiber optic cables routed through the end ports 308 can be fastened (e.g., with fasteners such as bolts or screws) otherwise secured to the cable anchoring plate 316. In certain examples, the closure 300 manages both drop cables and mid-span access cables and all of the cables strength members that are anchored to the closure 300 through the cable anchoring plate 316.

The tray mounting tower 318 functions to mount the fiber management tray 20e to the closure 300 and to elevate the fiber management tray 20e above the cable anchoring plate 316. The tray mounting tower 318 includes a latching post 328 located at one end of the middle portion 322 and a pivot mount post 330 positioned at the opposite end of the middle portion 322. The latching post 328 and the pivot mount post 330 both extend well above the top side of the cable anchoring plate 316. The pivot arm 320 functions to pivotally connect the fiber management tray 20e to the pivot mount post 330. When the closure 300 is closed, the fiber management tray 20e is latched in a stowed position by the latch post 328 (see FIG. 29). In the stowed position, the fiber management tray 20e is generally parallel to the major top and bottom sides of the closure 300 with a gap being provided between the bottom side of the fiber management tray 20e and the top side of the cable anchoring plate 316. The spacing between the bottom side of the fiber management tray 20e and the cable anchoring plate 316 provides space for routing and managing buffer tubes used to protect optical fibers as the optical fibers are routed from their corresponding fiber optic cables to the tray 20e. With the fiber management tray 20e in the stowed position and the top portion 304 of the closure 300 removed from the bottom portion 302, the top side of the fiber management tray 20e is accessible while the bottom side of the fiber management tray 20e is inaccessible.

As described in previous embodiments, optical fibers can be routed on the fiber management tray 20e such that optical fibers suitable for splicing to drop cables are provided at the top side of the fiber management tray 20e while pass-through fibers, optical components such as splitters or wavelength division multiplexers, and other structures can be provided at the bottom side of the fiber management tray 20e. To access the bottom side of the fiber management tray 20e, one end of the fiber management tray 20e is released from the latching post 320 by allowing the fiber management tray 20e to be pivoted relative to the pivot mount post 330 from the stowed position to an open position. In certain examples, the fiber management tray 20e pivots about a pivot axis 332 (FIG. 30) defined at the pivot mount post 330 and the fiber management tray 20e can pivot at least 180 degrees about the pivot axis 332 between the stowed position and the open position. In this manner, the bottom side of the tray 20e can be readily accessed when the tray 20e is in the open position. In certain examples, the latching post 328 can include a resilient latch for latching the fiber management tray 20e in the stowed position.

Referring to FIGS. 33-36, the fiber management tray 20e is similar to previously described embodiments and includes fiber management structures on both sides of the tray, excess fiber storage structures and looping structures at both sides of the tray, routing transition structures for routing optic fibers between the top and bottom sides of the tray, buffer tube anchoring structures for anchoring buffer tubes to the top and bottom sides of the tray, and structures for attaching splice holders and optical components to the tray.

Figure 31:
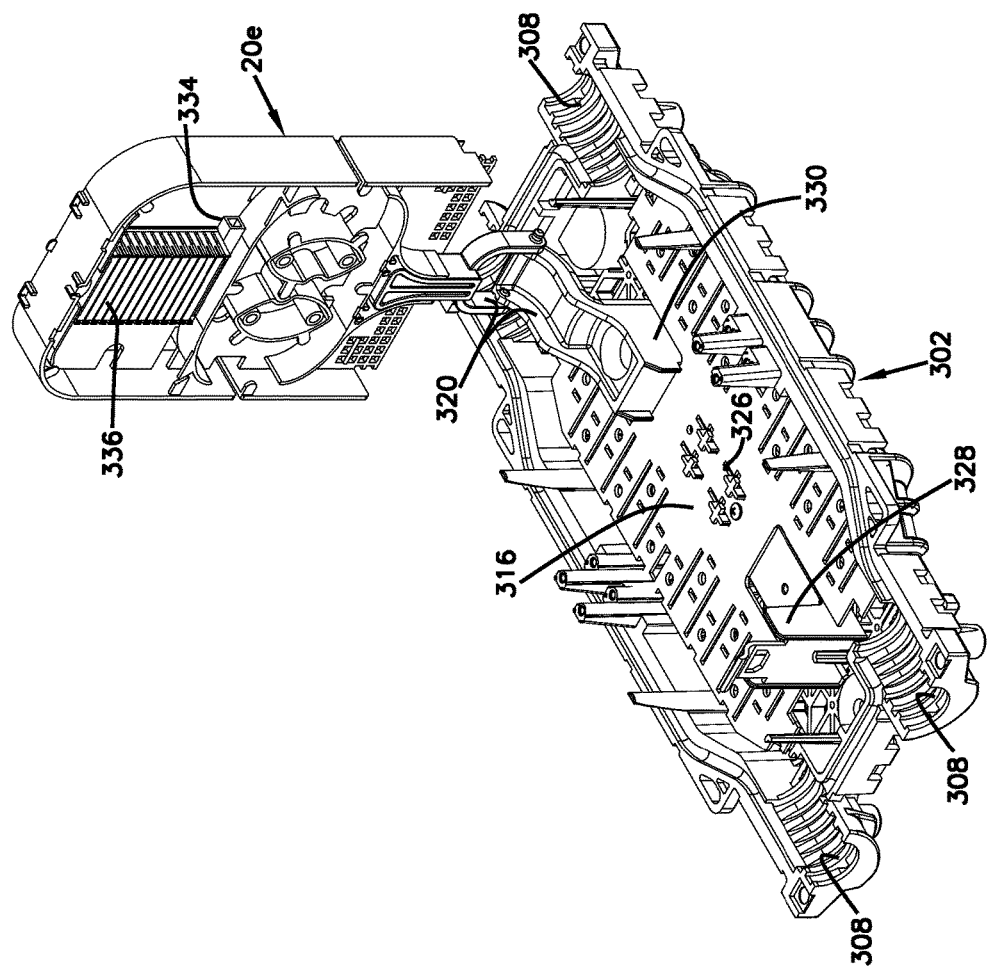
FIG. 31 illustrates the closure bottom half of FIG. 29 with the tray pivoted upwardly 90 degrees from the stowed position shown at FIG. 29.
Figure 32:
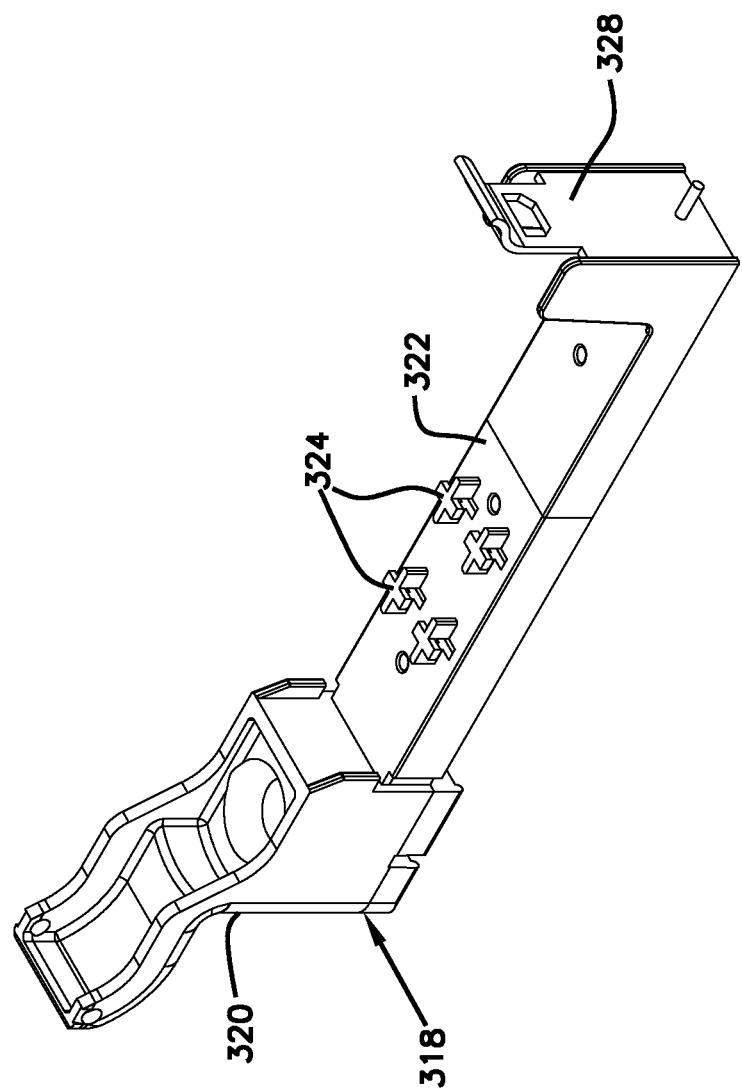
FIG. 32 shows a mounting tower for pivotally attaching the tray to the bottom piece of the closure.
Figure 33:
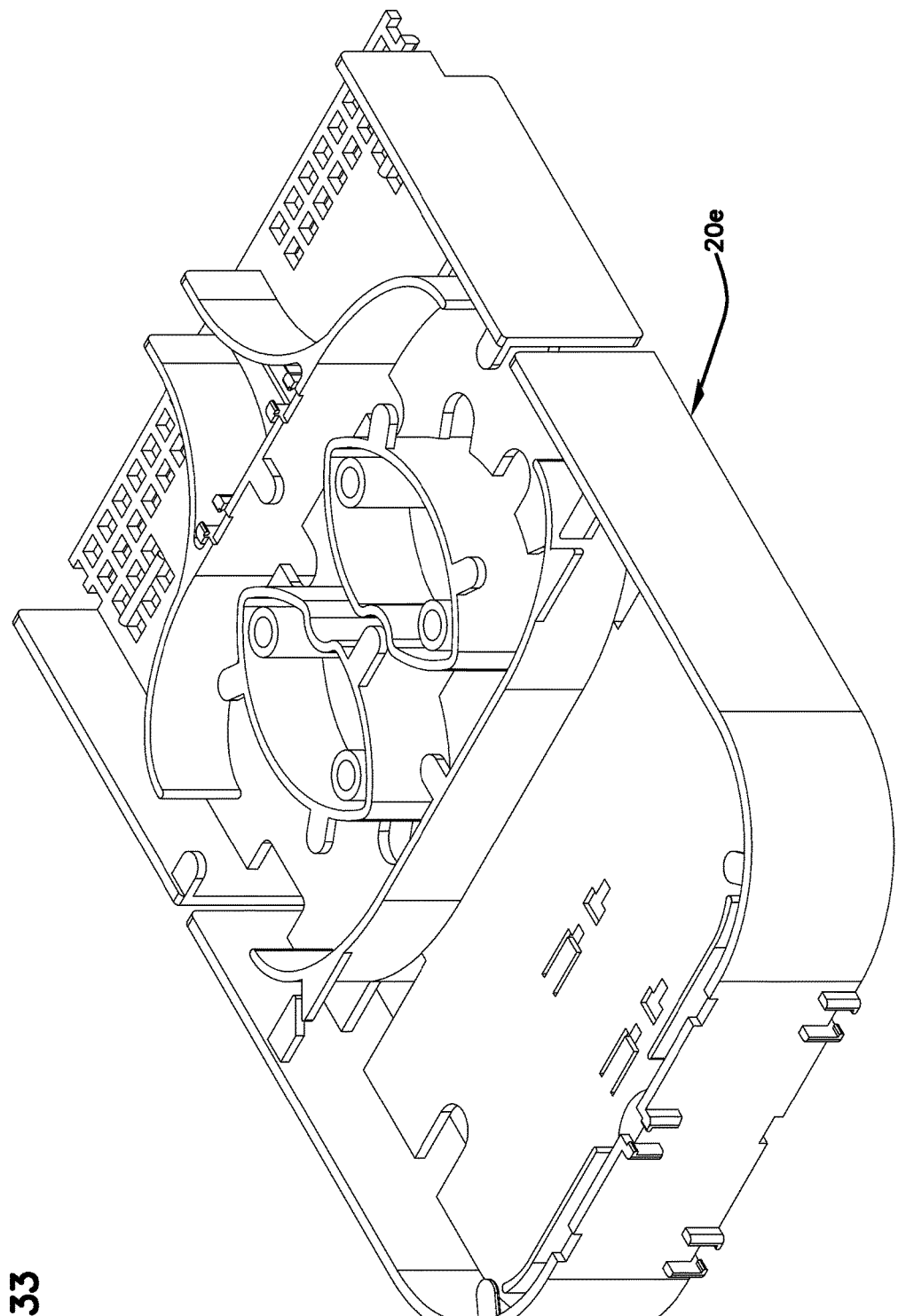
FIG. 33 is a perspective view showing a bottom view of the tray that mounts within the closure of FIG. 27.
Figure 34:
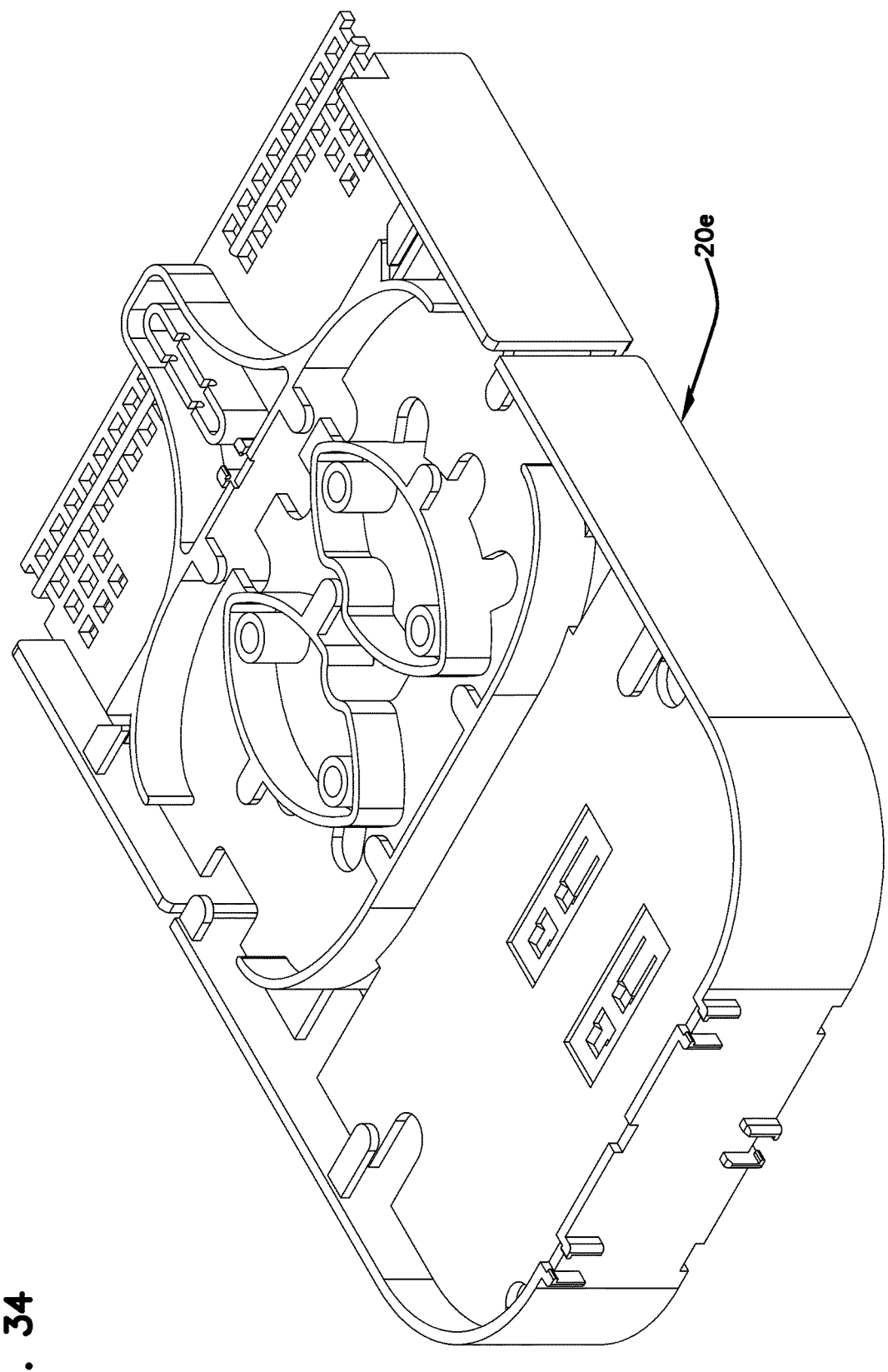
FIG. 34 is a top perspective view of the tray of FIG. 33.
Figure 35:
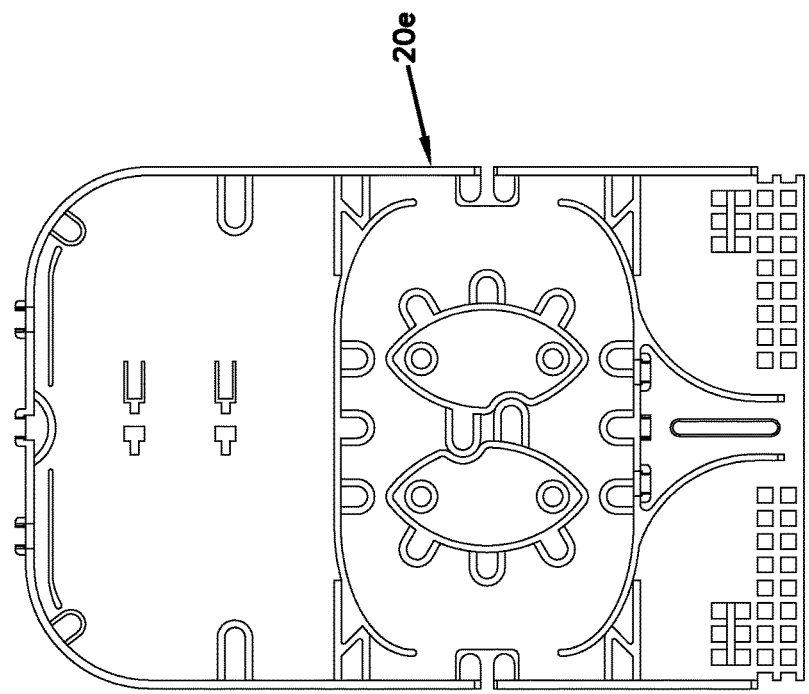
FIG. 35 is a plan view of the bottom side of the tray housed within the closure of FIG. 27.
Figure 36:
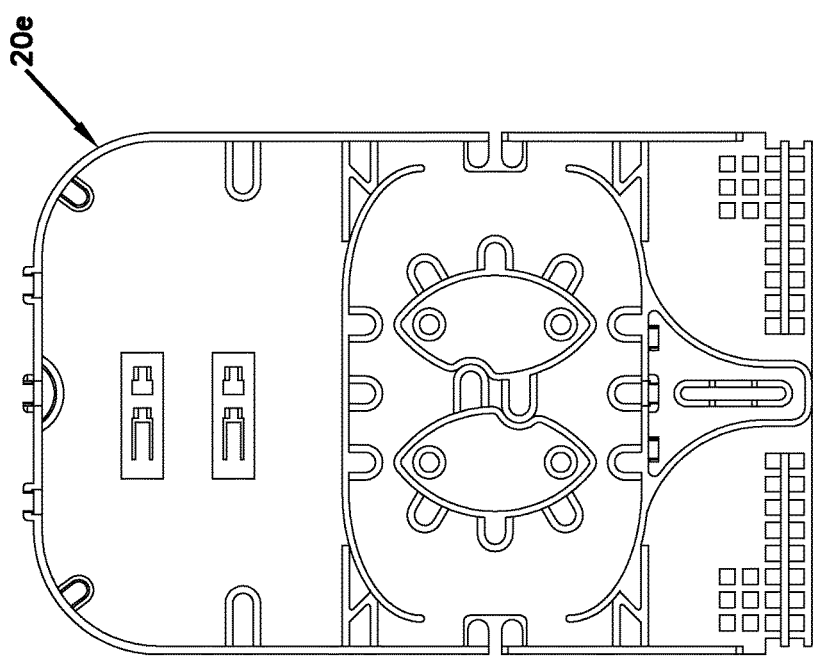
FIG. 36 is a plan view of the top side of the tray of FIG. 35.
Figure 37:
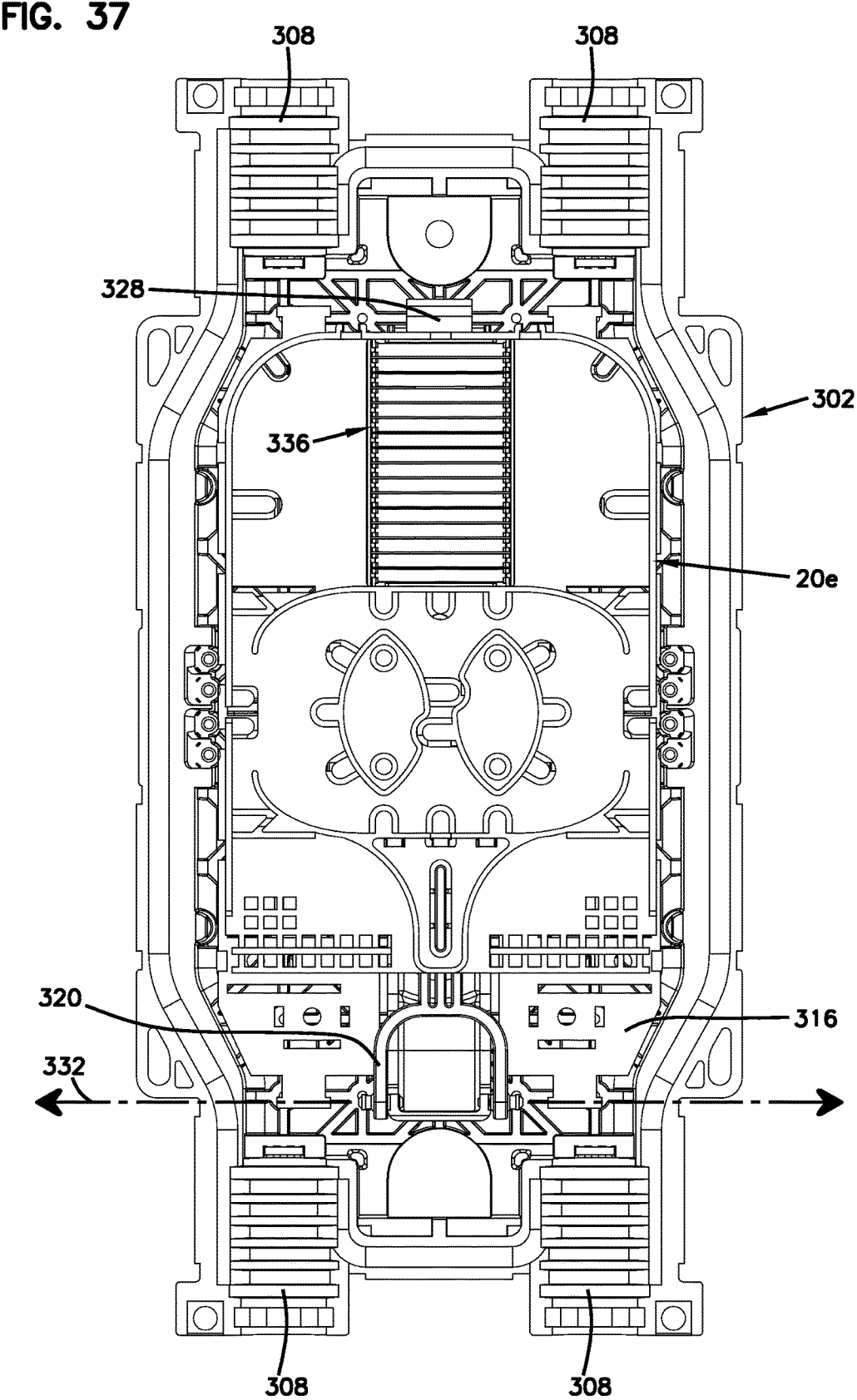
FIG. 37 is a top, plan view of the bottom half of the closure of FIG. 27 with the tray mounted therein and pivoted to the stowed position.
Figure 38:
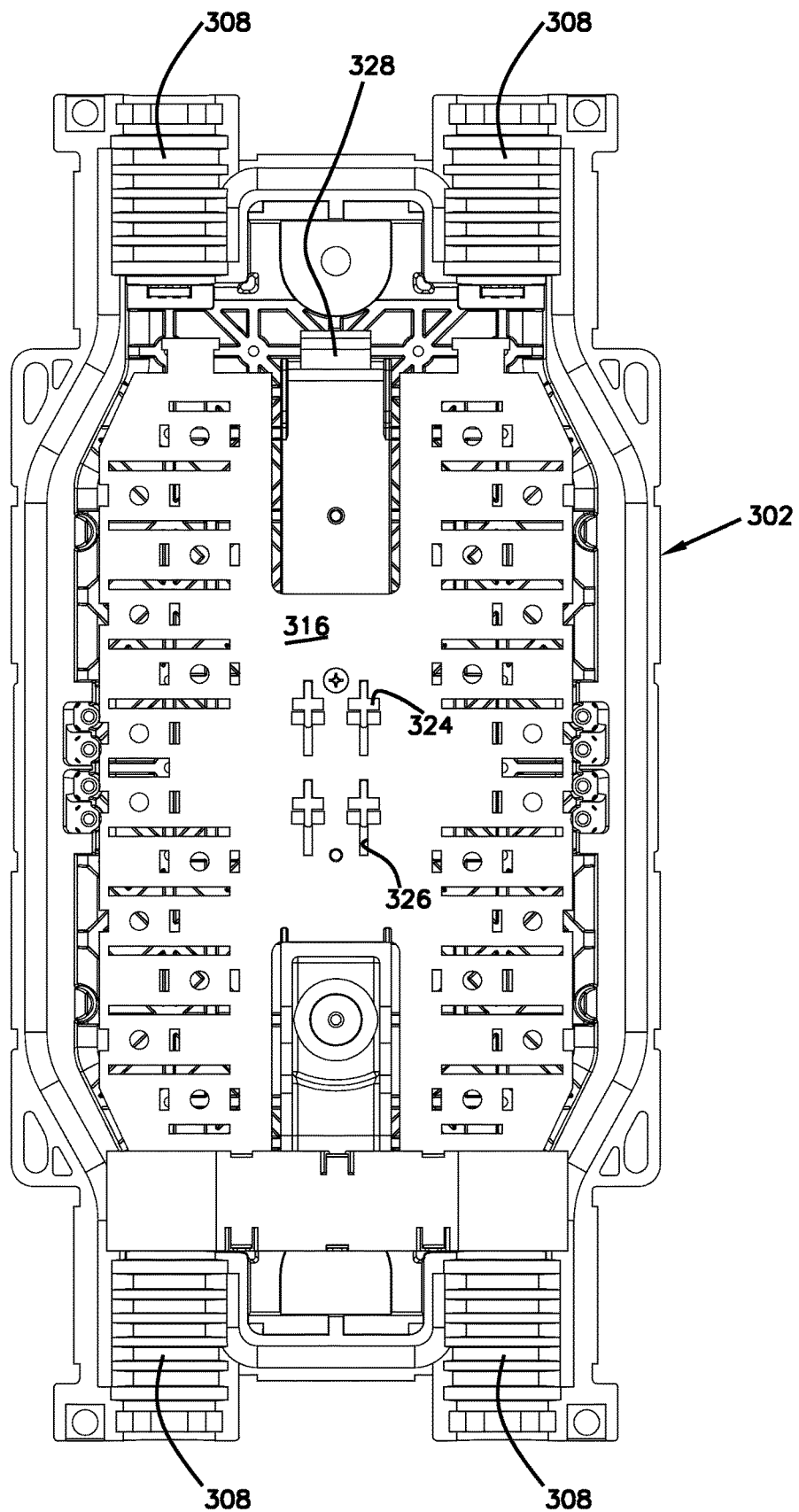
FIG. 38 is a top, plan view of the bottom half of the closure of FIG. 27 showing a cable anchoring plate and the tray mounting tower attached to the bottom section of the closure.
Figure 39:
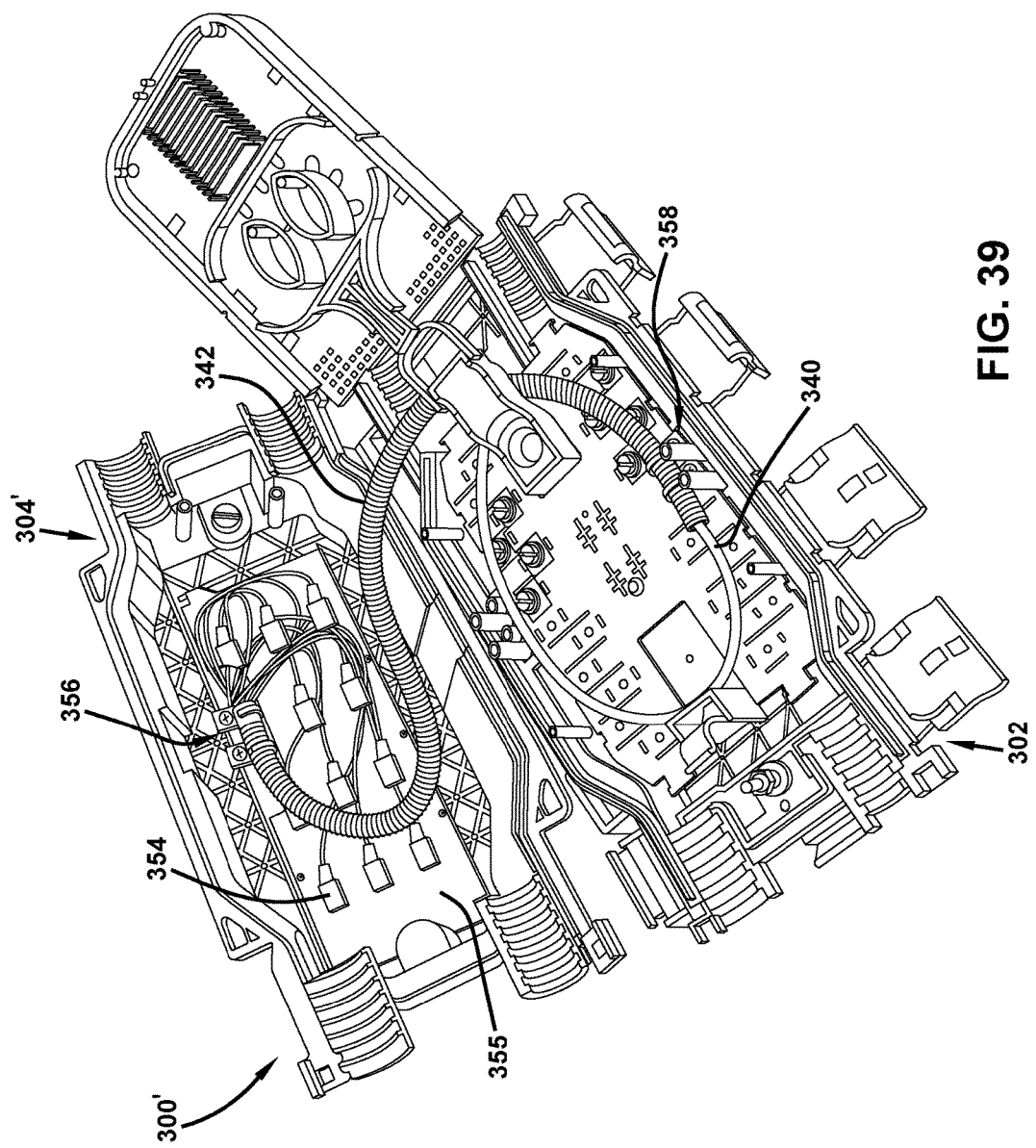
FIGS. 39-43 show another enclosure in accordance with the principles of the present disclosure.
Figure 40:
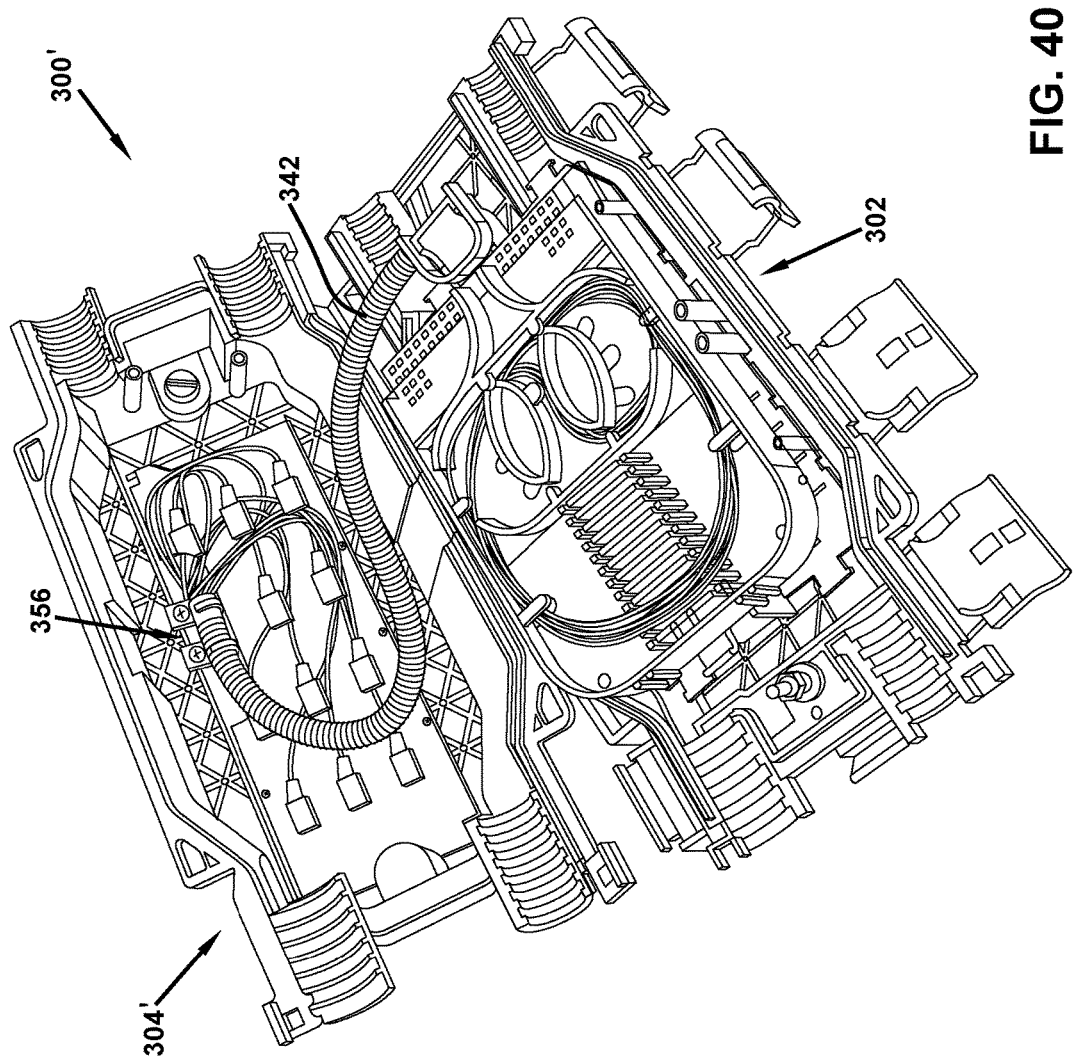
Figure 41:
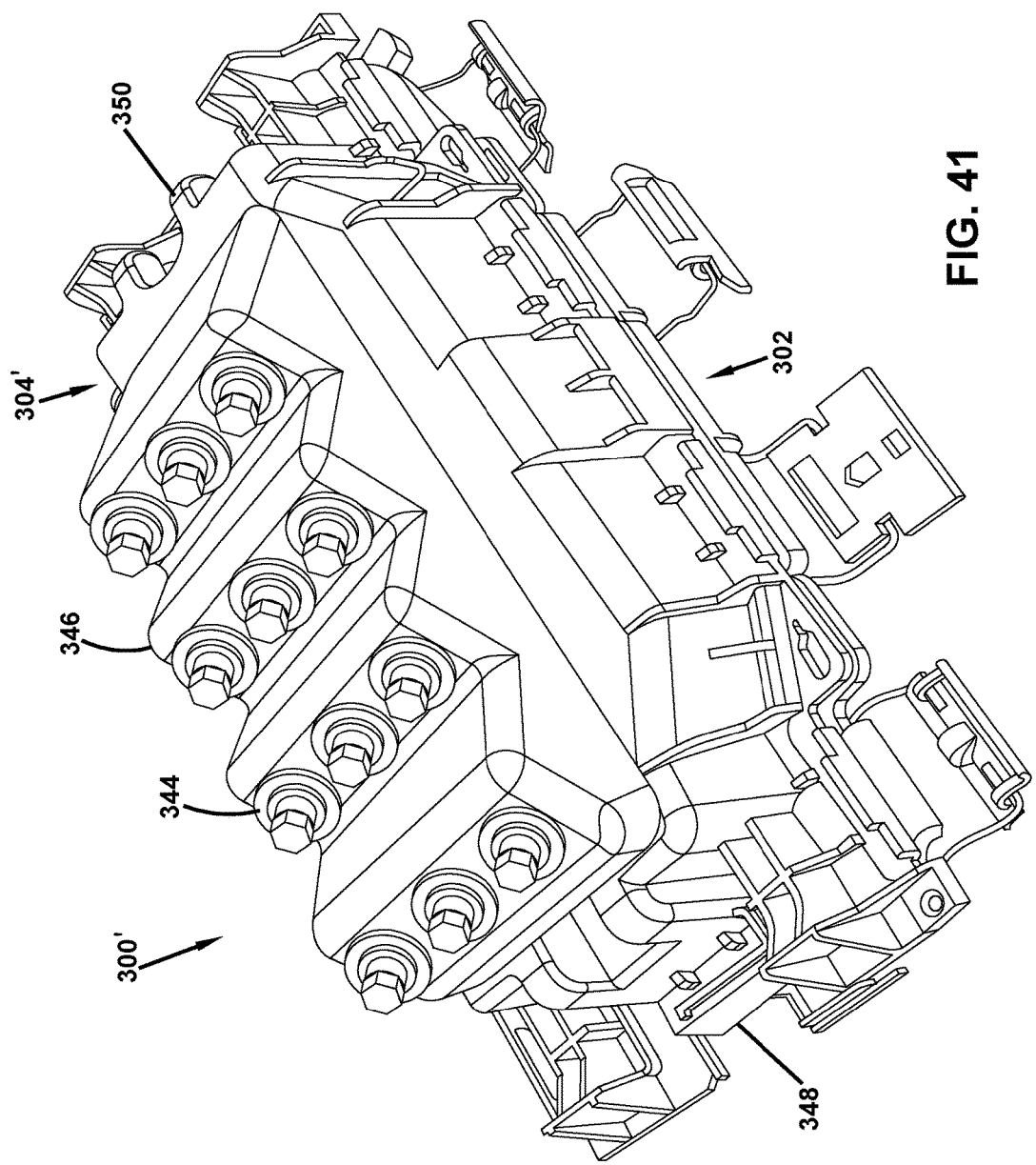
Figure 42:
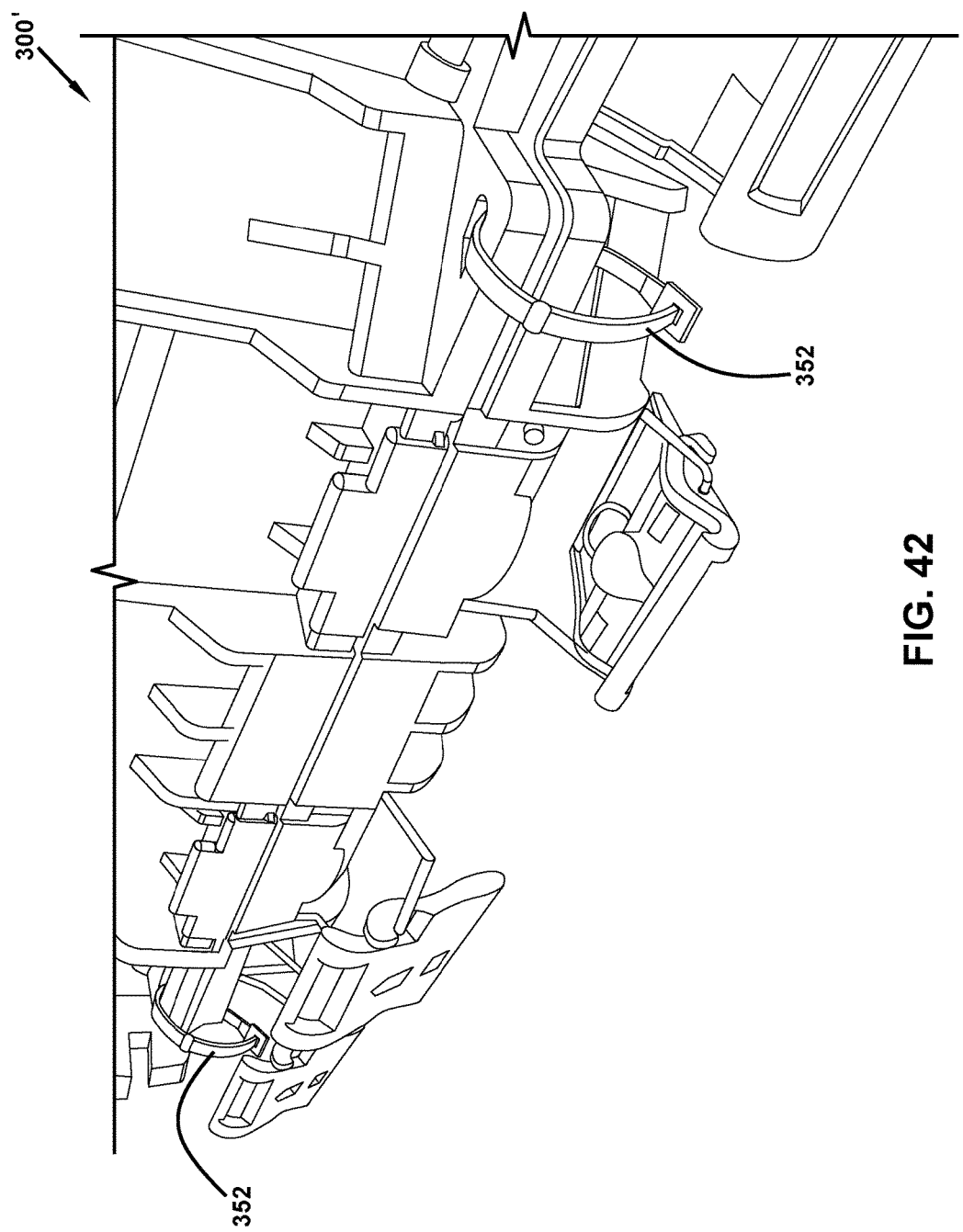
Figure 43:
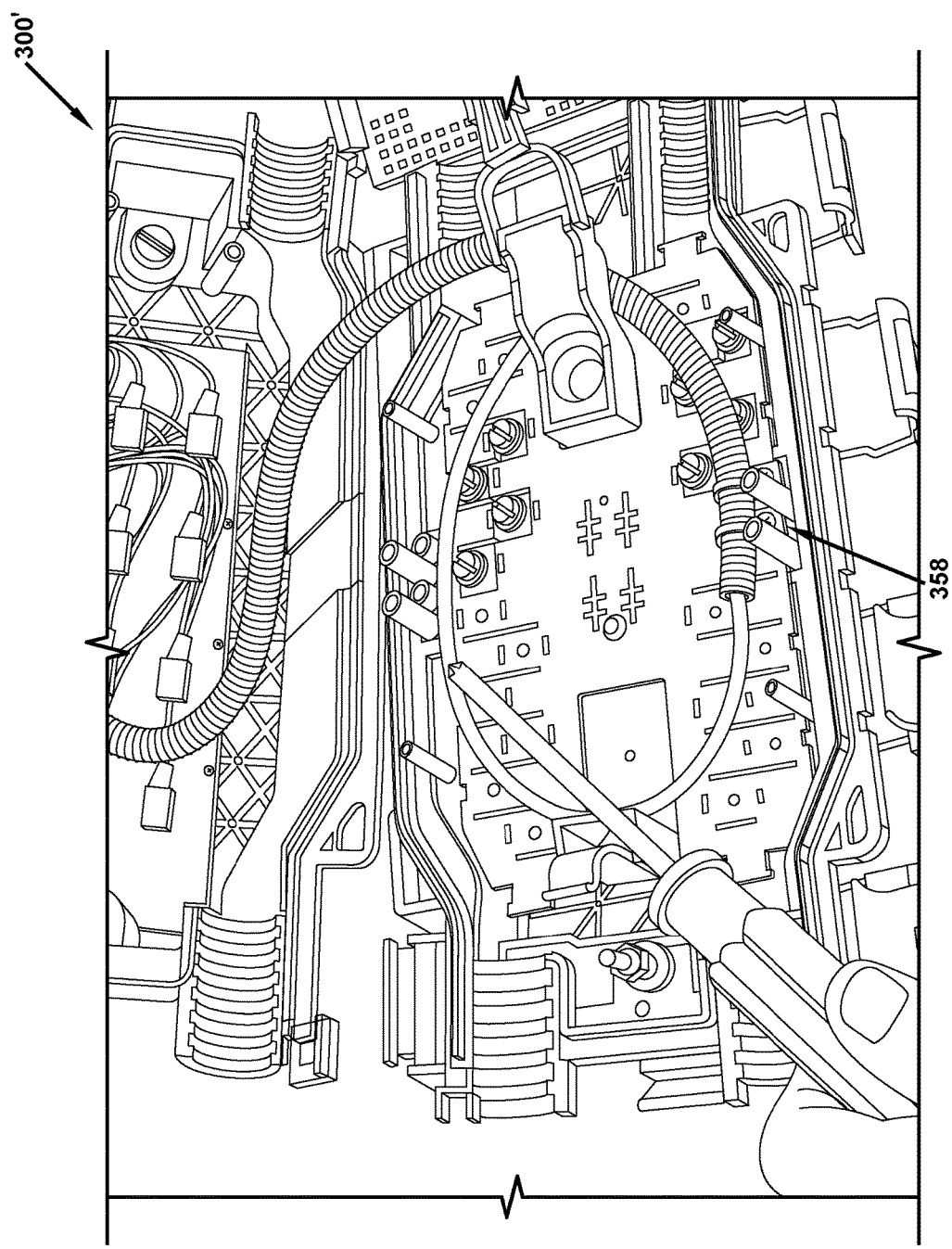

As shown at FIG. 31, an optical component such as a passive optical splitter 334 is attached to the bottom side of the fiber management tray 20e. Also, a plurality of splice holders 336 are attached to the bottom side of the tray. Further, as shown at FIG. 30, plurality of splice holders 338 are attached to the top side of the tray. In an example configuration, the closure 300 can be used to provide fiber management, fiber protection, and optical splitting at a mid-span location of a multi-fiber cable.

In such an example, an upstream end section of the multi-fiber cable can be routed through one of the end ports 308 and a downstream end section of the multi-fiber cable can be routed through another one of the end ports 308. A mid-span access location of the multi-fiber fiber optic cable can be managed within the closure 300. Strength members corresponding to the upstream and downstream end portions of the multi-fiber fiber optic cable can be anchored to the cable anchoring plate 316 with fasteners. Buffer tubes corresponding to the fibers of the multi-fiber fiber optic cable can be managed in the region beneath the fiber management tray 20e and can be routed to the fiber management tray 20e. Ends of the buffer tubes can be secured (e.g., strapped) to the end of the fiber management tray 20e that is closest to the pivot access 332. Optical fibers from the multi-fiber fiber optic cable can be managed at the bottom side of the fiber management tray 20e. For example, at least one of the optical fibers can be cut and spliced to an input side of the passive optical splitter 334. Output fibers from the passive optical splitter 334 can be routed through the routing transition structures from the bottom side of the fiber management tray 20e to the top side of the fiber management tray 20e where such output fibers are ready for easy splicing to drop cables. Other optical fibers from the multi-fiber fiber optic cable can be cut and spliced to the output fibers of the passive optical splitter 334 at the bottom side of the fiber management tray 20e. Such splices can be held within the splice holder 336. Such a configuration allows signals from the passive optical splitter 334 to be directed through either the upstream end section or downstream end section of the multi-fiber fiber optic cable.

It will be appreciated that drop cables 312 (FIG. 30) can also be routed through the end ports 308. Strength members corresponding to the drop cables 312 can be attached to the cable anchoring plate 316. Buffer tubes corresponding to the drop cables 312 can be managed in the region directly above the cable anchoring plate 316. Ends of the buffer tubes corresponding to the drop cables 312 can be attached to the buffer tube anchoring locations at the top side of the fiber management tray 20e. Buffer tubes of the multi-fiber fiber optic cable are preferably attached to the buffer tube anchoring locations at the bottom side of the fiber management tray 20e. The optical fibers corresponding to the drop cables 312 can be spliced to the output fibers from the passive optical splitter 334 at the top side of the fiber management tray 20e. The splices can be held within the splice holder 338 mounted at the top side of the fiber management tray 20e.

FIGS. 39-43 show an alternative enclosure 300' in accordance with the principles of the present disclosure. The enclosure 300' has the same bottom portion 302 as the enclosure 300 and can house any of the fiber trays disclosed herein. The trays can include optical splitters and can also include splice holders. The enclosure 300' includes a top portion 304' that clamps and seals to the bottom portion 302 in the same matter as the top portion 304. The top portion 304' supports a plurality of ruggedized fiber optic adapters 344 mounted at a main face 346 of the top portion 304'. The adapters 344 have exterior sealed ports adapted to receive ruggedized connectors from outside the enclosure 300'. The ruggedized connectors can be secured with a threaded connection, a bayonet connection or other robust mechanical connection. The ruggedized connectors are sealed relative to the enclosure 300' when secured within the exterior ports. The ruggedized adapters 344 also include interior ports for receiving connectorized ends 354 of a factory manufactured stub assembly including a plurality of connectorized pigtails. The non-connectorized ends of the pigtails/stub assembly can be spliced to fibers from a main cable at the splice tray. A protective cover 355 can be mounted inside the top portion 304' so as to cover the inner ports of the ruggedized adapters 344 and also to cover the portions of the pigtails routed to the adapter ports. The cover 355 can be transparent. The connectorized ends 354 of the pigtails are shown visible through the transparent cover 355. The connectorized ends 354 can be inserted in the interior ports of the ruggedized adapters 344. The portions of the pigtails extending outside of the cover 355 can be protected within a transport tube 340 (e.g., a furcation tube) which can also be contained within a corrugated protective tube 342. The top portion 304' can be connected to the bottom portion 302 by a floating hinge structure 352 (e.g., a replaceable, disconnectable, non-rigid hinge) such as loops made of tie-wrap. Such a floating hinge allows translational as well as pivotal movement between the top and bottom portions thereby allowing more uniform compression of the housing seals as the top and bottom portions are secured together (e.g., clamped together). The transport tube 340 can be routed in an "S"-shaped pattern from an anchoring location 356 on the top portion 304' (e.g., adjacent to the cover) to an anchoring location 358 on the bottom portion 302. The exterior ports or the ruggedized adapters 344 are oriented at an angled configuration so as to face at least partially toward one end of the enclosure 300'. The bottom and top portions are symmetrical about a central axis so that the top portion 304' can be mounted in one of two different mounting configurations that are offset 180 degrees from one another. In one configuration, the exterior ports face toward one end 348 of the enclosure and in the other configuration the adapter ports face toward the other end 350 of the enclosure. The hinges 352 can be disconnected and then re-attached to allow the configurations to be reversed. The anchoring location 358 of the transfer tube is moved to the opposite side of the enclosure 300' to accommodate reversing of the top portion 304'. In certain examples, the top portion 304' can be used to replace the cover 304 of an existing one of the splice closures 300 in the field. In this way, the enclosure 300' can be upgraded to include a connectorized configuration. The ability to mount the top portion 304' in different configurations allows the ports to face in the proper direction (e.g., upwardly on a pole for aerial applications and downwardly on a pole for under underground applications) without having to adjust the orientation of the bottom portion 302 and without having to disturb any existing cabling or splices. Example ruggedized fiber optic connectors and adapters are disclosed at U.S. Pat. No. 7,744,288, which is hereby incorporated by reference in its entirety.

From the foregoing detailed description, it will be evident that modifications and variations can be made without departing from the spirit and scope of the disclosure.

What is claimed is:

1. A fiber management apparatus comprising:
a fiber management tray including a top surface at a top side thereof and an opposite bottom surface at an opposite bottom side thereof, the fiber management tray being elongated along a length of the fiber management tray, the fiber management tray including first and second ends separated by the length of the fiber management tray;
bar mounting locations defined by a plurality of openings through the fiber management tray; and
an anchoring bar removably attached to the fiber management tray at the first and second ends, the anchoring bar including a support member with a bottom side, latches being positioned at the bottom side such that the latches fit into the plurality of openings by a snap-fit connection, the anchoring bar including a plurality of anchoring location members that project laterally outwardly from opposing sides of the support member, each one of the plurality of anchoring location members having an end with an enlarged head, the anchoring bar extending across a majority width of the fiber management tray;
the fiber management tray including fiber guide walls and end walls that project upwardly from the top surface, the fiber guide walls and end walls together defining at least one fiber routing path on the top side of the fiber management tray.

2. The fiber management apparatus of claim 1, wherein the plurality of anchoring location members are cantilevers adapted for securing buffer tubes.

3. The fiber management apparatus of claim 1, wherein the plurality of anchoring location members are at the bottom side of the fiber management tray and at the top side of the fiber management tray.

4. The fiber management apparatus of claim 1, wherein the plurality of anchoring location members have lengths that extend along the length of the fiber management tray.

5. The fiber management apparatus of claim 1, wherein sets of openings through a main body of the fiber management tray are configured to receive ties used to secure buffer tubes receiving the optical fibers of through-cables to the bottom side of the fiber management tray.

6. The fiber management apparatus of claim 1, further comprising a closure for housing the fiber management tray, wherein the fiber management tray is pivotally movable relative to the closure between a stowed position and an open position, and wherein the fiber management tray can pivot at least 180 degrees between the stowed position and the open position.

7. The fiber management apparatus of claim 6, wherein the closure includes a bottom portion and a top portion, and wherein the bottom and top portions are configured to be clamped together by a floating hinge structure.

8. The fiber management apparatus of claim 7, wherein the floating hinge structure is a replaceable, disconnectable, non-rigid hinge that allows for translational as well as pivotal movement between the top and bottom portions.

9. The fiber management apparatus of claim 7, wherein the floating hinge structure is a loop made of tie-wrap.

10. The fiber management apparatus of claim 6, further comprising a tray mounting tower attached to a bottom portion of the closure for pivotally mounting the fiber management tray to the closure.

11. The fiber management apparatus of claim 10, further comprising a cable anchoring plate secured within the bottom portion of the closure, wherein the tray mounting tower elevates the fiber management tray relative to the cable anchoring plate when the fiber management tray is in the stowed position such that an open space is provided between the cable anchoring plate and the fiber management tray for routing and managing buffer tubes.

12. The fiber management apparatus of claim 11, wherein the tray mounting tower includes a portion that extends beneath and is attached to the cable anchoring plate, and wherein the tray mounting tower includes a latching post for latching one end of the fiber management tray when the fiber management tray is in the stowed position, and a pivot mount post for pivotally attaching an opposite end of the fiber management tray to the tray mounting tower.

13. The fiber management apparatus of claim 1, wherein the access structure includes a slot having an open end at a periphery of the fiber management tray, and wherein the fiber transition opening includes a main portion and a slot portion, the slot portion defining an access portion, the slot portion having an open end offset from the main portion.

14. The fiber management apparatus of claim 1, wherein the access structure is defined at least in part by a portion of a fiber transition opening that is open at a side of the fiber management tray.

15. A fiber management tray including a top side and an opposite bottom side, the fiber management tray being elongated along a length of the fiber management tray, the fiber management tray including first and second ends separated by the length of the fiber management tray, the fiber management tray including fiber guide walls and end walls that project upwardly from the top side of the fiber management tray, the fiber management tray comprising:
bar mounting locations defined by a plurality of openings through the fiber management tray; and
an anchoring bar removably attached to the fiber management tray at the first and second ends, the anchoring bar including a support member with a bottom side, latches being positioned at the bottom side such that the latches fit into the plurality of openings by a snap-fit connection, the anchoring bar including a plurality of anchoring location members that project laterally outwardly from opposing sides of the support member, each one of the plurality of anchoring location members having an end with an enlarged head, the anchoring bar extending across a majority width of the fiber management tray.

16. The fiber management tray of claim 15, wherein the plurality of anchoring location members are cantilevers adapted for securing buffer tubes.

17. The fiber management tray of claim 15, wherein the plurality of anchoring location members are at the bottom side of the fiber management tray and at the top side of the fiber management tray.

18. The fiber management tray of claim 15, wherein the plurality of anchoring location members have lengths that extend along the length of the fiber management tray.

19. A fiber management tray comprising:
a main tray body having a top surface at a top side thereof and an opposite bottom surface at an opposite bottom side thereof, the fiber management tray being elongated along a length of the fiber management tray, the fiber management tray including first and second ends separated by the length of the fiber management tray;
curved end walls that project upwardly from the top surface of the main tray body;
inner fiber guide walls that project upwardly from the top surface of the main tray body, the curved end walls and the inner fiber guide walls together defining a cable routing path that includes a fiber management loop elongated along the length of the fiber management tray;
splice holder mounting locations for receiving and retaining splice holders;
tabs extending over fibers routed along the fiber management loop to retain the fibers in the fiber management tray;
bar mounting locations defined by a plurality of openings through the main tray body; and
an anchoring bar having a main support member with a bottom side, latches being positioned at the bottom side such that the latches fit into the plurality of openings by a snap-fit connection, the main support member having a plurality of anchoring location members that project laterally outwardly from opposing sides of the main support member, each one of the plurality of anchoring location members having an end with an enlarged head.

20. The fiber management tray of claim 19, wherein the anchoring bar extends across a majority width of the fiber management tray.

21. The fiber management tray of claim 19, wherein the number of the plurality of anchoring location members projecting from the main support member is greater than the number of the plurality of openings in the main tray body.

* * * * *